US008938234B2

(12) United States Patent
Ueda et al.

(10) Patent No.: US 8,938,234 B2
(45) Date of Patent: Jan. 20, 2015

(54) MOBILE COMMUNICATION SYSTEM

(75) Inventors: Yoshio Ueda, Minato-ku (JP); Sadafuku Hayashi, Minato-ku (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/062,053

(22) PCT Filed: Oct. 1, 2010

(86) PCT No.: PCT/JP2010/067224
§ 371 (c)(1),
(2), (4) Date: May 6, 2011

(87) PCT Pub. No.: WO2011/040596
PCT Pub. Date: Apr. 7, 2011

(65) Prior Publication Data
US 2011/0207428 A1   Aug. 25, 2011

(30) Foreign Application Priority Data

Oct. 1, 2009   (JP) ................. 2009-229391

(51) Int. Cl.
*H04W 76/00* (2009.01)
*H04W 4/22* (2009.01)
*H04W 12/12* (2009.01)
*H04W 60/04* (2009.01)

(52) U.S. Cl.
CPC ............. *H04W 4/22* (2013.01); *H04W 60/04* (2013.01); *H04W 76/007* (2013.01); *H04W 12/12* (2013.01)
USPC ............. 455/435.1; 455/404.1; 455/521

(58) Field of Classification Search
USPC .................. 455/435.1, 404.1, 521
See application file for complete search history.

(56) References Cited

U.S. PATENT DOCUMENTS

2004/0043775 A1* 3/2004 Kennedy et al. .......... 455/456.2
2009/0262683 A1* 10/2009 Khetawat et al. ............ 370/328

FOREIGN PATENT DOCUMENTS

JP   2003-244284 A   8/2003
JP   2003244284      8/2003

(Continued)

OTHER PUBLICATIONS

3GPP TS 25.467, "3rd Generation Partnership Project; Technical Specification Group Radio Access Network; Utran architecture for 3G Home Node B (HNB); Stage 2, (Release 9)", Sep. 2009, pp. 1-27.

(Continued)

*Primary Examiner* — Ariel Balaoing
(74) *Attorney, Agent, or Firm* — Sughrue Mion, PLLC

(57) ABSTRACT

A mobile communication system of the present invention includes: a mobile station; a base station wirelessly communicating with the mobile station; and a gateway apparatus connected to the base station and a core network. The base station includes: first transmission means for transmitting a registration message for registering the mobile station in the gateway apparatus; and second transmission means for transmitting a message pertaining to establishment of an emergency call originated by the mobile station. The gateway apparatus includes: first reception means for receiving the registration message from the base station; second reception means for receiving an establishment message pertaining to establishment of the emergency call from the base station; and check means for checking consistency between the registration message and the establishment message.

20 Claims, 39 Drawing Sheets

(56) References Cited

FOREIGN PATENT DOCUMENTS

| JP | 2007-520131 A | 7/2007 |
|---|---|---|
| JP | 2009-510969 A | 3/2009 |
| JP | 2009-516454 A | 4/2009 |
| JP | 2009-212915 A | 9/2009 |
| RU | 78998 U1 | 12/2002 |
| RU | 2232472 C2 | 7/2004 |
| RU | 2328825 C1 | 7/2008 |
| WO | WO 02/080499 A1 | 10/2002 |
| WO | 2009/013792 A1 | 1/2009 |
| WO | 2009/054294 A1 | 4/2009 |

OTHER PUBLICATIONS

3GPP TR 23.869 V9.0.0 (Mar. 2009) Technical Specification; 3rd Generation Partnership Project; Technical Specification Group Services and System Aspects; Support for Internet Protocol (IP) based IP Multimedia Subsystem (IMS) Emergency calls over General Packet Radio Service (GPRS) and Evolved Packet Service (EPS) (Release 9) p. 1-36.

3GPP TS 24.008 v8.4.0 (Dec. 2008) Technical Specification; 3rd General Partnership Project; Teechnical Specification Group Core Network and Terminals; Mobile radio interface Layer 3 specification; Core network protocols; Stage 3 (Release 8); pp. 1-571.

3GPP TS 24.008 Ver 8.5.0, Sections 9.2.9, 9.3.8, 9.3.23 Setup, 9.5.1, 10.5.3.3, 10.5.4.7, 10.5.6.1, and Figure 10.5.91, Dec. 2008.

3GPP TS 25.413, Dec. 2009.

3GPP TS 25.467 Ver 8.0.0, Sections 5.1.2 and 5.1.3, Dec. 2008.

3GPP TS 25.469 V8.0.0 (Dec. 2008); Technical Specification; 3rd General Partnership Project; Technical Specification Group Radio Access Network; UTRAN Iuh interface Home Node B Application Part (HNBAP) signalling (Release 8).

ETSI TS 122 011 V8.6.0 (Jan. 2009) Technical Specification; Digital cellular telecommunications system (Phase 2+); Universal Mobile Telecommunications System (UMTS); Ltd; Service accessibilty (3GPP TS 22.011 version 8.6.0 Release 8).

NEC : "Potential Security risks relating to Rel8 Ue registration", 3GPP Draft; R3-091952_HNB-Fake-Emergency-for Discussion, 3rd Generation Partnership Project (3GPP), Mobile Competence Centre; 650, Route Des Lucioles; F-06921 Sophia-Antipolis Cedex; France, no. Shenzhen, China; 20090820, Aug. 20, 2009, XP050353304, total 3 pages.

NEC: "Correction of potential security risks relating to Rel8 UE registration", 3GPP Draft; R3-091953_HNB-Fake-Emergency-Stage2-CR, 3rd Generation Partnership Project (3GPP), Mobile Competence Centre; 650, Route Des Lucioles; F-06921 Sophia-Antipolis Cedex; France, no. Shenzhen, China; 20090820, Aug. 20, 2009, XP050353305, total 5 pages.

NEC: "Correction of potential security risks relating to Rel8 UE registration", 3GPP Draft; R3-091954_HNB-Fake-Emergency-CR_for_Initial_UE_Message, 3rd Generation Partnership Project (3GPP), Mobile Competence Centre; 650, Route Des Lucioles; F-06921 Sophia-Antipolis Cedex; France, no. Shenzhen, China; 20090820, Aug. 20, 2009, XP050353306, total 22 pages.

Extended European Search Report issued on Mar. 6, 2012 in counterpart European Application No. 10816403.9.

Communication dated Dec. 2, 2011, issued by the Russian Patent Office in correponding Russian Patent Application No. 2011112399/08(018350).

Communication dated Dec. 24, 2013, issued by the Japanese Patent Office in corresponding Application No. 2012-050486.

Alcatel-Lucent, Huawei, "Cleanup of 25.467", 3GPP TSG-RAN3, Meeting #65, R3-092049, Aug. 2009, 9 pages total.

Communication dated Aug. 19, 2014, from the Japanese Patent Office in counterpart Japanese Application No. 2012050486.

3GPP TR 23.869 V9.0.0 (2009-03) Technical Specification; 3rd Generation Partnership Project; Technical Specification Group Services and System Aspects; Support for Internet Protocol (IP) based IP Multimedia Subsystem (IMS) Emergency calls over General Packet Radio Service (GPRS) and Evolved Packet Service (ESP) (Release 9) p. 1-36.

3GPP TS 24.008 v8.4.0 (2008-12) Technical Specification; 3rd General Partnership Project; Teechnical Specification Group Core Network and Terminals; Mobile radio interface Layer 3 specification; Core network protocols; Stage 3 (Release 8); pp. 1-571.

3GPP TS 24.008 Ver 8.5.0, Sections 9.2.9, 9.3.8, 9.3.23 Setup, 9.5.1, 10.5.3.3, 10.5.4.7, 10.5.6.1, and Figure 10.5.91.

3GPP TS 25.331 Ver 8.5.0, Section 10.3.3.11.

3GPP TS 25.413.

3GPP TS 25.467 Ver 8.0.0, Sections 5.1.2 and 5.1.3.

3GPP TS 25.469 V8.0.0 (2008-12); Technical Specification; 3rd General Partnership Project; Technical Specification Group Radio Access Network; UTRAN Iuh interface Home Node B Application Part (HNBAP) signalling (Release 8).

ETSI TS 122 011 V8.6.0 (2009-01) Technical Specification; Digital cellular telecommunications system (Phase 2+); Universal Mobile Telecommunications System (UMTS); Ltd; Service accessibilty (3GPP TS 22.011 version 8.6.0 Release 8).

* cited by examiner

Fig.2 (RELATED ART)

RRC CONNECTION REQUEST(TS25.331)

RRC Connection Request is the first message transmitted by the UE when setting up an RRC Connection to the network.

RLC-SAP: TM

Logical channel: CCCH

Direction: UE → UTRAN

| Information Element/Group name | Need | Multi | Type and reference | Semantics description | Version |
|---|---|---|---|---|---|
| Message Type | MP | | Message Type | | |
| Radio Bearer IEs | | | | | |
| Predefined configuration status information | MP | | Boolean | True indicates the UE has all pre- configurations stored with the same value tag as broadcast in the cell in which the RRC connection establishment is initiated | REL-5 |
| UE Information elements | | | | | |
| Initial UE identity | MP | | Initial UE identity 10.3.3.15 | | |
| Establishment cause | MP | | Establishment cause 10.3.3.11 | | |
| Protocol error indicator | MD | | Protocol error indicator 10.3.3.27 | Default value is FALSE | |
| >UE Specific Behaviour Information 1 idle | OP | | UE Specific Behaviour Information 1 idle 10.3.3.51 | This IE shall not be included in this version of the protocol | |
| . . . | | | | | |

Fig.3 (RELATED ART)

INITIAL DIRECT TRANSFER(TS25.331)

This message is used to initiate a signalling connection based on indication from the upper layers, and to transfer a NAS message.

RLC-SAP: AM

Logical channel: DCCH

Direction: UE -> UTRAN

| Information Element/Group name | Need | Multi | Type and reference | Semantics description | Version |
|---|---|---|---|---|---|
| Message Type | MP | | Message Type | | |
| UE information elements | | | | | |
| Integrity check info | CH | | Integrity check info 10.3.3.16 | | |
| PLMN identity | OP | | PLMN identity 10.3.1.11 | This IE indicates the PLMN to which the UE requests the signalling connection to be established. | REL-6 |
| CN information elements | | | | | |
| CN domain identity | MP | | CN domain identity 10.3.1.1 | | |
| Intra Domain NAS Node Selector | MP | | Intra Domain NAS Node Selector 10.3.1.6 | | |
| NAS message | MP | | NAS message 10.3.1.8 | | |
| START | OP | | START 10.3.3.38 | START value to be used in the CN domain as indicated in the IE "CN domain identity". This IE shall always be present in this version of the protocol. | |
| Establishment cause | OP | | Establishment cause 10.3.3.11 | | Rel-5 |
| CS Call Type | CV-Conversatio nalCS | | Enumerated (speech, video, other) | One spare value is needed | REL-7 |
| Measurement information elements | | | | | |
| Measured results on RACH | OP | | Measured results on RACH 10.3.7.45 | | |
| MBMS joined information | OP | | | | REL-6 |
| >P-TMSI | OP | | P-TMSI (GSM-MAP) 10.3.1.13 | | REL-6 |

Fig.4 (RELATED ART)

Establishment cause(TS25.331)

Cause for an RRC connection establishment request.

| Information Element/Group name | Need | Multi | Type and reference | Semantics description |
|---|---|---|---|---|
| Establishment cause | MP | | Enumerated(<br>Originating Conversational Call,<br>Originating Streaming Call,<br>Originating Interactive Call,<br>Originating Background Call,<br>Originating Subscribed traffic Call,<br>Terminating Conversational Call,<br>Terminating Streaming Call,<br>Terminating Interactive Call,<br>Terminating Background Call,<br>Emergency Call,<br>Inter-RAT cell re-selection,<br>Inter-RAT cell change order,<br>Registration, Detach,<br>Originating High Priority Signalling,<br>Originating Low Priority Signalling,<br>Call re-establishment,<br>Terminating High Priority Signalling,<br>Terminating Low Priority Signalling,<br>Terminating – cause unknown, MBMS reception, MBMS ptp RB request) | Eleven spare values are needed. |

Fig.5 (RELATED ART)

UE REGISTER REQUEST

This message is sent by the HNB to the HNB-GW to register a UE at HNB-GW for service.

Direction: HNB → HNB-GW

| PARAMETER | PRESENCE | RANGE | IE Type and Reference | Semantics Description | Criticality | Assigned Criticality |
|---|---|---|---|---|---|---|
| Message Type | M | | 9.2.1 | | YES | reject |
| UE Identity | M | | 9.2.17 | | YES | reject |
| Registration Cause | M | | 9.2.21 | | YES | ignore |
| UE Capabilities | M | | 9.2.24 | | YES | reject |

Fig.6 (RELATED ART)

Registration Cause

Indicates if a UE registration is for an emergency call.

| Information Element/Group name | Presence | Range | Type and reference | Semantics description |
|---|---|---|---|---|
| Registration cause | | | Enumerated { emergency call, normal, ...} | |

Fig.16
(RELATED ART)

Table 9.2.11/3GPP TS 24.008: CM SERVICE REQUEST message content

| IEI | Information element | Type/Reference | Presence | Format | Length |
|---|---|---|---|---|---|
|  | Mobility management protocol discriminator | Protocol discriminator 10.2 | M | V | ½ |
|  | Skip Indicator | Skip Indicator 10.3.1 | M | V | ½ |
|  | CM Service Request message type | Message type 10.4 | M | V | 1 |
|  | CM service type | CM service type 10.5.3.3 | M | V | ½ |
|  | Ciphering key sequence number | Ciphering key sequence number 10.5.1.2 | M | V | ½ |
|  | Mobile station classmark | Mobile station classmark 2 10.5.1.6 | M | LV | 4 |
|  | Mobile identity | Mobile identity 10.5.1.4 | M | LV | 2-9 |
| 8- | Priority | Priority Level 10.5.1.11 | O | TV | 1 |

Fig.17
(RELATED ART)

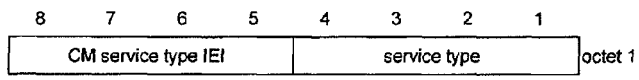

Figure 10.5.77/3GPP TS 24.008 *CM Service Type* information element

Table 10.5.91/3GPP TS 24.008: *CM Service Type* information element

```
Service type (octet 1)
Bits
4 3 2 1
0 0 0 1   Mobile originating call establishment or packet mode connection
          establishment
0 0 1 0   Emergency call establishment
0 1 0 0   Short message service
1 0 0 0   Supplementary service activation
1 0 0 1   Voice group call establishment
1 0 1 0   Voice broadcast call establishment
1 0 1 1   Location Services    (NOTE)

All other values are reserved.
NOTE:            this service type shall only be used by a type A LMU if the MM
         connection was requested for the transmission of LCS signalling
         messages specified in 3GPP TS 44.071 [23a].
```

Fig.19

INITIAL UE MESSAGE

This message is sent by the RNC to transfer the radio interface initial layer 3 message to the CN.
Direction: RNC → CN.
Signalling bearer mode: Connection oriented.

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| CN Domain Indicator | M | | 9.2.1.5 | | YES | ignore |
| LAI | M | | 9.2.3.6 | | YES | ignore |
| RAC | C - ifPS | | 9.2.3.7 | | YES | ignore |
| SAI | M | | 9.2.3.9 | | YES | ignore |
| NAS-PDU | M | | 9.2.3.5 | | YES | ignore |
| Iu Signalling Connection Identifier | M | | 9.2.1.38 | | YES | ignore |
| Global RNC-ID | M | | 9.2.1.39 | If the Extended *RNC-ID* IE is included in the message, the *RNC-ID* IE in the *Global RNC-ID* IE shall be ignored. | YES | ignore |
| GERAN Classmark | O | | 9.2.1.57 | | YES | ignore |
| Selected PLMN Identity | O | | 9.2.3.33 | | YES | ignore |
| NAS Sequence Number | O | | 9.2.3.34 | | YES | ignore |
| Permanent NAS UE Identity | O | | 9.2.3.1 | | YES | ignore |
| Redirect Attempt Flag | O | | 9.2.3.50 | | YES | ignore |
| Extended RNC-ID | O | | 9.2.1.39a | The *Extended RNC-ID* IE shall be used if the RNC identity has a value larger than 4095. | YES | reject |
| CSG Id | O | | 9.2.1.85 | | YES | reject |
| Emergency Cause | O | | 9.2.1.xx | | YES | ignore |

Fig.30
(RELATED ART)

COMMON ID

This message is sent by the CN to inform the RNC about the permanent NAS UE identity for a user. It may include additional information.

Direction: CN → RNC.

Signalling bearer mode: Connection oriented.

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| Permanent NAS UE Identity | M | | 9.2.3.1 | | YES | ignore |
| SNA Access Information | O | | 9.2.3.24 | | YES | ignore |
| UESBI-Iu | O | | 9.2.1.59 | | YES | ignore |
| Selected PLMN Identity | O | | 9.2.3.33 | | YES | ignore |
| Subscriber Profile ID for RAT/Frequency priority | O | | 9.2.1.86 | | YES | ignore |
| Call type | O | | 9.2.1.xx | | YES | ignore |

Fig.31

| case | Call Type | Registration Cause | operation of HNB-GW |
|---|---|---|---|
| 1 | Normal Call | Normal Call | perform normal process |
| 2 | Normal Call | Emergency Call | perform call releasing |
| 3 | Emergency Call | Normal Call | perform normal process |
| 4 | Emergency Call | Emergency Call | perform normal process |

Fig.34

DIRECT TRANSFER

This message is sent by both the CN and the RNC and is used for carrying NAS information over the Iu interface.

Direction: RNC → CN and CN → RNC.

Signalling bearer mode: Connection oriented.

| IE/Group Name | Presence | Range | IE type and reference | Semantics descriptio n | Criticality | Assigned Criticality |
|---|---|---|---|---|---|---|
| Message Type | M | | 9.2.1.1 | | YES | ignore |
| NAS-PDU | M | | 9.2.3.5 | | YES | ignore |
| LAI | O | | 9.2.3.6 | | YES | ignore |
| RAC | O | | 9.2.3.7 | | YES | ignore |
| SAI | O | | 9.2.3.9 | | YES | ignore |
| SAPI | O | | 9.2.3.8 | | YES | ignore |
| Redirection Indication | O | | 9.2.3.36 | | YES | ignore |
| Redirection Completed | O | | 9.2.3.35 | | YES | ignore |
| Subscriber Profile ID for RAT/Frequency priority | | | 9.2.1.86 | | YES | ignore |
| Call type | O | | 9.2.1.xx | | YES | ignore |

Fig.36

RAB ASSIGNMENT REQUEST

This message is sent by the CN to request the establishment, modification or release of one or more RABs for the same UE.

Direction:           CN→RNC.

Signalling bearer mode:           Connection oriented.

| IE/Group Name | Presence | Range | IE type and reference | Semantics description | Criticality | Assigned Criticality |
|---|---|---|---|---|---|---|
| Message Type | M | | 9.2.1.1 | | YES | reject |
| RABs To Be Setup Or Modified List | O | | | | YES | ignore |
| >RABs To Be Setup Or Modified Item IEs | | 1 to <maxnoofRABs> | | | | |
| >>First Setup Or Modify Item | M | | | Grouping reason: same criticality | EACH | reject |
| >>>RAB ID | M | | 9.2.1.2 | The same RAB ID must only be present in one group. | - | |
| >>>NAS Synchronisation Indicator | O | | 9.2.3.18 | | - | |
| >>>RAB Parameters | O | | 9.2.1.3 | Includes all necessary parameters for RABs (both for MSC and SGSN) including QoS. | - | |
| >>>User Plane Information | O | | | | - | |
| >>>>User Plane Mode | M | | 9.2.1.18 | | - | |
| >>>>UP Mode Versions | M | | 9.2.1.19 | | - | |
| >>>Transport Layer Information | O | | | | - | |
| >>>>Transport Layer Address | M | | 9.2.2.1 | | - | |
| >>>>Iu Transport Association | M | | 9.2.2.2 | | - | |
| >>>Service Handover | O | | 9.2.1.41 | | - | |
| >>Second Setup Or Modify Item | M | | | Grouping reason: same criticality | EACH | ignore |
| >>> PDP Type Information | O | | 9.2.1.40 | | - | |
| >>>Data Volume Reporting Indication | O | | 9.2.1.17 | | - | |
| >>>DL GTP-PDU Sequence Number | O | | 9.2.2.3 | | - | |
| >>>UL GTP-PDU Sequence Number | O | | 9.2.2.4 | | - | |
| >>>DL N-PDU Sequence Number | O | | 9.2.1.33 | | - | |
| >>>UL N-PDU Sequence Number | O | | 9.2.1.34 | | - | |
| >>>Alternative RAB Parameter Values | O | | 9.2.1.43 | | YES | ignore |
| >>>GERAN BSC Container | O | | 9.2.1.58 | | YES | ignore |
| >>>Call type | O | | 9.2.1.xx | | YES | ignore |
| RABs To Be Released List | O | | | | YES | ignore |
| >RABs To Be Released Item IEs | | 1 to <maxnoofRABs> | | | EACH | ignore |
| >>RAB ID | M | | 9.2.1.2 | The same RAB ID must only be present in one group. | - | |
| >>Cause | M | | 9.2.1.4 | | - | |

Fig.39

| IE/Group Name | Presence | Range | IE type and reference | Semantics description | Criticality | Assigned Criticality |
|---|---|---|---|---|---|---|
| Allocation/Retention Priority | | | | | . | |
| >Priority Level | M | | INTEGER {spare (0), highest (1), ..., lowest (14), no priority (15)} (0..15) | Desc.: This IE indicates the priority of the request. Usage: Values between 1 and 14 are ordered in decreasing order of priority, '1' being the highest and '14' the lowest. Value 0 shall be treated as a logical error if received. The priority level and the preemption indicators may be used to determine whether the request has to be performed unconditionally and immediately | | |
| >Pre-emption Capability | M | | ENUMERATED(shall not trigger pre-emption, may trigger pre-emption) | Descr.: This IE indicates the pre-emption capability of the request on other RABs Usage: The RAB shall not pre-empt other RABs or, the RAB may pre-empt other RABsThe Pre-emption Capability indicator applies to the allocation of resources for a RAB and as such it provides the trigger to the pre-emption procedures/processes of the RNS. | | |
| >Pre-emption Vulnerability | M | | ENUMERATED(not pre-emptable, pre-emptable) | Desc.: This IE indicates the vulnerability of the RAB to preemption of other RABs. Usage: The RAB shall not be pre-empted by other RABs or the RAB may be pre-empted by other RABs.Pre-emption Vulnerability indicator applies for the entire duration of the RAB, unless modified and as such indicates whether the RAB is a target of the pre-emption procedures/processes of the RNS | | |
| >Queuing Allowed | M | | ENUMERATED(queuing not allowed, queuing allowed) | Desc.: This IE indicates whether the request can be placed into a resource allocation queue or not. Usage: Queuing of the RAB is allowed Queuing of the RAB is not allowed Queuing allowed indicator applies for the entire duration of the RAB, unless modified. | | |

MOBILE COMMUNICATION SYSTEM

This application is a National Stage of Application No. PCT/JP2010/067224 filed Oct. 1, 2010, claiming priority based on Japanese Patent Application No. 2009-229391 filed Oct. 1, 2009, the contents of all of which are incorporated herein by reference in their entirety.

TECHNICAL FIELD

The present invention relates to a mobile communication system.

BACKGROUND ART

It is considered that industrial utilization forms of a femto base station (Home Node B; hereinafter abbreviated as HNB) include, for example, a form of utilization as a small wireless base station intended for home use, and a form of utilization as a small wireless base station in a corporation.

A case of providing service by the HNB includes, for example, the following advantages:

(1) Capability for providing a call service in a blind zone, where radio waves from a macro base station do not reach;

(2) Capability for providing a billing service less expensive than typical services provided by the macro base station;

(3) Capability for taking advantage of speed-enhancement technologies of 64QAM (64 Quadrature Amplitude Modulation) and MIMO (Multiple Input Multiple Output) and thereby allowing a high-speed packet service subordinate to the HNB to be provided, because the distance between a base station and a mobile station is short and the mobile station can attain high wireless quality (Ec/Io); and (4) Capability for providing a specific content service taking advantage of locality of the HNB.

As described above, service by HNB includes a lot of advantages. Accordingly, it is preferable to provide the service only for subscribers having signed a contract with a carrier and subscribers that the owner of the HNB permits.

Thus, the 3GPP (3rd Generation Partnership Project), in release 8, has introduced a CSG (Closed Subscriber Group) such that only mobile stations in a permitted group can access the HNB and enjoy the service.

The CSG will herein be described in detail with reference to FIG. 1.

A third generation mobile communication system shown in FIG. 1 includes HNB 20, femto base station gateway (Home Node B GW; hereinafter abbreviated as HNB-GW) 30, circuit switching station (Mobile Switching Center; hereinafter abbreviated as MSC) 40, packet switching station (Serving GPRS Support Node; hereinafter abbreviated as SGSN) 50, and third generation mobile stations 10-1 and 10-2.

In FIG. 1, mobile station 10-1 among mobile stations 10-1 and 10-2 residing in an area subordinate to HNB 20 is an authorized mobile station. On the other hand, mobile station 10-2 is a mobile station that intends to receive a service by HNB 20 in an unauthorized manner, and hereinafter is referred to as unauthorized mobile station 10-2. In the case of a mobile station that does not identify itself, such a mobile station will be referred to as mobile station 10.

HNB 20 is connected to a core network of an operator via HNB-GW 30.

The core network, which is a core network apparatus, includes MSC 40 that controls circuit switching and SGSN 50 that controls packet switching.

If HNB 20 supports a CSG function, HNB 20 notifies mobile station 10 residing in an area subordinate to HNB 20 of the CSG identifier (CSG identity) of the own CSG cell.

Mobile station 10-1 decodes the CSG identifier notified from HNB 20, and determines whether the CSG identifier is included in a CSG list included in mobile station 10-1.

If the CSG identifier is included in the CSG list, mobile station 10-1 camps on a CSG cell where mobile station 10-1 resides, and is capable of enjoying various services, such as origination of a call and reception of an incoming call.

On the other hand, if the CSG identifier is not included in the CSG list, mobile station 10-1 does not camp on the CSG cell where mobile station 10-1 resides, but performs an operation of selecting an appropriate CSG cell other than the CSG cell concerned.

This mechanism enables only selected mobile station 10-1 with CSG identifier of the CSG cell of HNB 20 to access HNB 20.

However, a case can be supposed where it is intended to receive a service in an unauthorized manner in an originally inaccessible CSG cell of HNB 20 as with unauthorized mobile station 10-2 shown in FIG. 1 even though the CSG function is supported.

In such a case, MSC 40 or SGSN 50 checks the IMSI (International Mobile Subscriber Identity) of mobile station 10 and the CSG identifier of the CSG cell where mobile station 10 resides, and thereby performs access regulation that regulates access from mobile station 10 to HNB 20 (3GPP TS25.467 Ver 8.0.0 Section 5.1.3).

On the other hand, because the CSG function has been introduced from release 8 of 3GPP, there was a case where mobile station 10-1, before release 8, did not support the CSG function. Further, there is a case where HNB 20 does not support the CSG function.

In these cases, HNB 20 performs an identification procedure (3GPP TS24.008 Ver 8.4.0) on mobile station 10-1 in order to inquire about the IMSI of mobile station 10-1. HNB 20 performs an HNBAP (HNB Application Part): UE REGISTER REQUEST procedure (3GPP TS25.469 Ver 8.0.0) on HNB-GW 30 in order to register mobile station 10-1 in HNB-GW 30. Here, HNB-GW 30 checks whether the IMSI of mobile station 10-1 is accessible or not to HNB 20, and thereby regulates access.

When HNB-GW 30 determines that mobile station 10-1 is accessible to HNB 20, HNB-GW 30 notifies HNB 20 that access is permitted, by means of an HNBAP: UE REGISTER ACCEPT message. Accordingly, the service by HNB 20 is provided for mobile station 10-1.

On the other hand, if mobile station 10 is unauthorized mobile station 10-2 shown in FIG. 1, the IMSI of unauthorized mobile station 10-2 will not have been registered to be accessible to the CSG. Accordingly, HNB-GW 30 determines that unauthorized mobile station 10-2 cannot access HNB 20, and notifies HNB 20 that access cannot be permitted, by means of HNBAP: UE REGISTER REJECT message. This terminates an RRC (Radio Resource Control) connection between unauthorized mobile station 10-2 and HNB 20 (3GPP TS25.467 Ver 8.0.0 Section 5.1.2).

As described above, in a case of providing the service by HNB 20, if unauthorized mobile station 10-2 whose access to HNB 20 is not permitted originates a call, the mobile communication network rejects access to HNB 20 in a signal establishment process because MSC 40, SGSN 50 or HNB-GW 30 regulates access on the basis of the IMSI of mobile station 10.

On the other hand, 3GPP standardization specifies that even mobile station 10 originally inaccessible to HNB 20 can originate a call if the call type is an emergency call (3GPP TS22.011 Ver 8.6.0 Section 8.5.1).

If the call type is an emergency call, mobile station 10-1 sets "Emergency Call" to an Establishment Cause parameter representing the cause of an establishment request in RRC: RRC CONNECTION REQUEST message or RRC: INITIAL DIRECT TRANSFER to be transmitted to HNB 20 on a RRC connection establishment request or a signaling connection establishment request (3GPP TS25.331 Ver 8.5.0 Section 10.3.3.11, Patent Literature 1).

HNB 20 then sets an "Emergency Call" value to a Registration Cause parameter in a HNBAP: UE REGISTER REQUEST message to be transmitted to HNB-GW 30.

If the Registration Cause parameter is "Emergency Call", HNB-GW 30 does not perform access regulation based on the IMSI (3GPP TS25.467 Ver 8.0.0 Section 5.1.2).

This method enables even mobile station 10 that originally is unable to access to HNB 20 to skip the access regulation of HNB-GW 30 and to access HNB 20 if the call type is an emergency call.

Here, FIG. 2 shows a configuration of an RRC: RRC CONNECTION REQUEST message; FIG. 3 shows a configuration of an RRC: INITIAL DIRECT TRANSFER message; FIG. 4 shows a configuration of the Establishment Cause parameter of an RRC protocol; FIG. 5 shows a configuration of an HNBAP: UE REGISTER REQUEST message; and FIG. 6 shows a configuration of a Registration Cause parameter of an HBNAP protocol.

CITATION LIST

Patent Literature

Patent Literature 1: JP 2003-244284A

SUMMARY OF INVENTION

Technical Problem

The aforementioned technique skips the access regulation of HNB-GW 30 and permits mobile station 10 to access HNB 20 if mobile station 10 has originated a call as an emergency call.

Thus, this enables even mobile station 10 that originally is unable to access to HNB 20, such as unauthorized mobile station 10-2, to access HNB 20, by misrepresenting the Establishment Cause parameter in the RRC protocol as "Emergency Call" and by being out of the access regulation of HNB-GW 30.

It is considered that such unauthorized mobile station 10-2 can easily be created by modifying software so as to falsify only the Establishment Cause parameter.

Instead, there is a case that an apparatus exists among authorized mobile station 10-1 and HNB 20, in which the apparatus decodes an RRC: RRC CONNECTION REQUEST message, that is to be transmitted from authorized mobile station 10-1 to a common channel (RACH: Random Access Channel) and is not concealed or subjected to measures against falsification, replaces the Establishment Cause parameter with "Emergency Call", encodes RRC: RRC CONNECTION REQUEST message, and transmits it to HNB 20. In this case, even the authorized mobile station 10-1 is treated the same way that aforementioned unauthorized mobile station 10-2 is treated.

Such unauthorized mobile station 10-2 causes following problems.

(1) HNB 20 installed in a home or a corporation is used by unauthorized mobile station 10-2 in an unauthorized manner.

(2) Unauthorized mobile station 10-2 can enjoy a billing service that is less expensive than a normal billing service by originating a call via HNB 20 in an unauthorized manner.

(3) A content service dedicated to specific users is enjoyed by unauthorized mobile station 10-2 in an unauthorized manner.

A method for solving these problems is considered where, when mobile station 10 has originated a call as an emergency call, the core network apparatus performs a call releasing process on mobile station 10. This requires that the core network apparatus knows that mobile station 10 has originated the call as an emergency call.

However, in the present configuration, the core network apparatus cannot know that mobile station 10 has originated a call as an emergency call.

Instead, it is also considered that HNB-GW 30 performs the call releasing process on mobile station 10 that has originated the call as an emergency call. This requires that HNB-GW 30 knows whether the type of the call that is actually originated by mobile station 10 is an emergency call or not.

However, in the present configuration, HNB-GW 30 cannot know the type of call that is actually originated by mobile station 10.

It is an object of the present invention to provide a mobile communication system where a core network apparatus is capable of knowing that a mobile station has originated a call as an emergency call.

It is another object of the present invention to provide a mobile communication system where a gateway apparatus is capable of knowing the type of a call that is actually originated by a mobile station.

Solution to Problem

A mobile communication system of the present invention includes:
a mobile station;
a base station wirelessly communicating with the mobile station; and
a gateway apparatus connected to the base station and a core network,
wherein the base station includes:
first transmission means for transmitting a registration message for registering the mobile station in the gateway apparatus; and
second transmission means for transmitting a message pertaining to establishment of an emergency call that is originated by the mobile station,
the gateway apparatus includes:
first reception means for receiving the registration message from the base station;
second reception means for receiving an establishment message pertaining to establishment of the emergency call from the base station; and
check means for checking the consistency between the registration message and the establishment message.

A gateway apparatus of the present invention is a gateway apparatus connecting a base station to a core network, including:
first reception means receiving a registration message for registering a mobile station in the gateway apparatus from the base station;
second reception means receiving an establishment message pertaining to an emergency call that is originated by the mobile station from the base station; and check means for checking the consistency between the registration message and the establishment message.

A first communication method of the present invention is a communication method by a mobile communication system including:
a mobile station;
a base station wirelessly communicating with the mobile station; and
a gateway apparatus connected to the base station and a core network,
wherein the base station transmits a registration message for registering the mobile station in the gateway apparatus,
the base station transmits a message pertaining to establishment of an emergency call that is originated by the mobile station,
the gateway apparatus receives the registration message from the base station,
the gateway apparatus receives an establishment message pertaining to establishment of the emergency call from the base station; and
the gateway apparatus performs a check of consistency between the registration message and the establishment message.

A second communication method of the present invention is a communication method by a gateway apparatus connecting a base station to a core network, including:
receiving a registration message for registering a mobile station in the gateway apparatus from the base station;
receiving an establishment message pertaining to establishment of an emergency call that is originated by the mobile station from the base station; and
performing a check of consistency between the registration message and the establishment message.

Advantageous Effects of Invention

According to the first mobile communication system, the base station or the gateway apparatus includes information indicating that the mobile station has originated an emergency call into a message and transmits the message to the core network apparatus.

Accordingly, an advantageous effect allowing the core network apparatus to know that the mobile station has originated a call as an emergency call can be obtained.

According to the second mobile communication system, the core network apparatus includes information indicating that the type of the call that is originated by the mobile station is an emergency call into a message and transmits the message to the gateway apparatus.

Accordingly, an advantageous effect allowing the gateway apparatus to know that the type of the call that is actually originated by the mobile station is an emergency call can be obtained.

BRIEF DESCRIPTION OF DRAWINGS

FIG. 2 is a diagram showing a configuration of an RRC CONNECTION REQUEST message.
FIG. 3 is a diagram showing a configuration of an INITIAL DIRECT TRANSFER message.
FIG. 4 is a diagram showing a configuration of an Establishment Cause parameter.
FIG. 5 is a diagram showing a configuration of a UE REGISTER REQUEST message.
FIG. 6 is a diagram showing a configuration of a Registration Cause parameter.
FIG. 16 is a diagram showing a configuration of a CM SERVICE REQUEST message.
FIG. 17 is a diagram showing a configuration of a CM Service Type parameter.
FIG. 19 is a diagram showing a configuration of an INITIAL UE MESSAGE message where an Emergency Cause parameter according to the present invention has been added.
FIG. 30 is a diagram showing a configuration of a COMMON ID message according to the present invention.
FIG. 31 is a diagram showing a table for determining a process in the HNB-GW according to a call type of the fourth exemplary embodiment.
FIG. 34 is a diagram showing a configuration of a DIRECT TRANSFER message according to the present invention.

FIG. 36 is a diagram showing a configuration of an RAB ASSIGNMENT REQUEST message according to the present invention.

FIG. 39 is a diagram showing a parameter of an Allocation/Retention Priority according to a seventh exemplary embodiment.

DESCRIPTION OF EMBODIMENTS

Exemplary embodiments will hereinafter be described with reference to the drawings.

Figure 1:
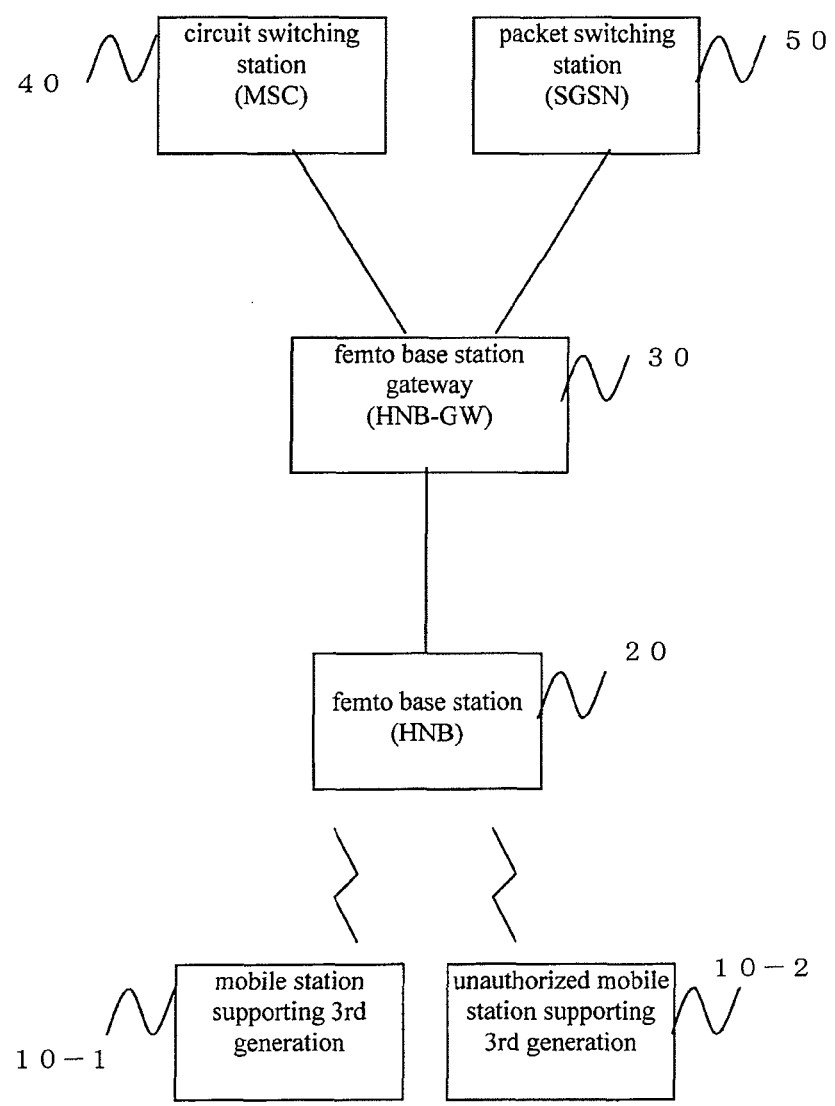
FIG. 1 is a diagram showing a configuration of a third generation mobile communication system.

The overall configuration of a mobile communication system of the exemplary embodiments, which will be described below, is identical to that of the mobile communication system shown in FIG. 1.

(First Exemplary Embodiment)

FIGS. 7 to 10 show configurations of HNB 20, HNB-GW 30, MSC 40 and SGSN 50 of this exemplary embodiment, respectively.

Figure 7:
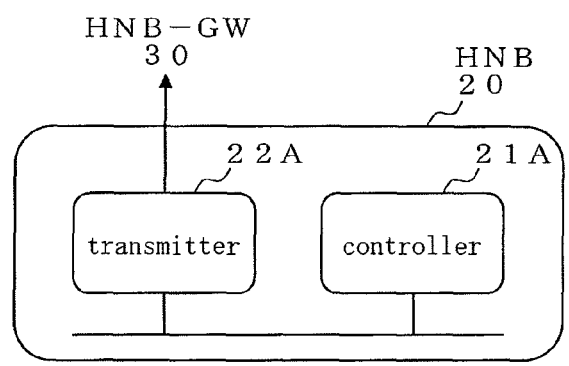
FIG. 7 is a block diagram showing a configuration of an HNB of a first exemplary embodiment.

Referring to FIG. 7, HNB 20 of this exemplary embodiment includes: controller 21A that includes information indicating that mobile station 10 has originated a call as an emergency call in an RANAP (Radio Access Network Application Part) protocol message; and transmitter 22A that transmits the RANAP protocol message to HNB-GW 30. The RANAP protocol message is a message in an application layer of a wireless access network, and includes, for example, a function of transparently transferring in an RAN a CC/MM signal to be transmitted and received between a UE and a core network apparatus.

Figure 8:
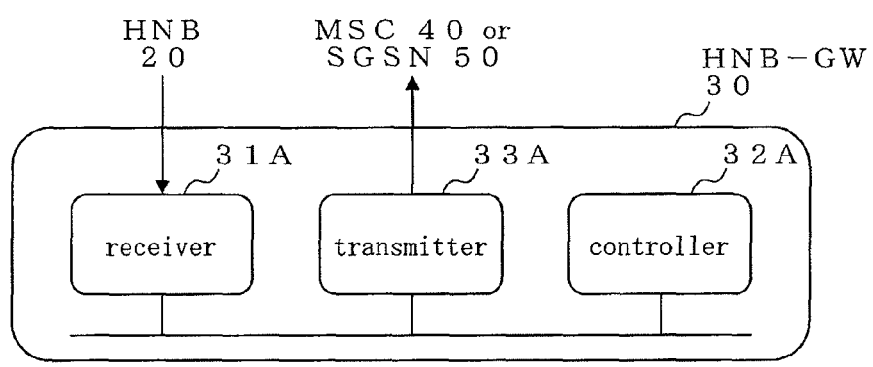
FIG. 8 is a block diagram showing a configuration of an HNB-GW of the first exemplary embodiment.

Referring to FIG. 8, HNB-GW 30 of this exemplary embodiment includes: receiver 31A that receives the RANAP protocol message from HNB 20; controller 32A extracting the RANAP protocol message; and transmitter 33A that transmits the RANAP protocol message to MSC 40 or SGSN 50.

Figure 9:
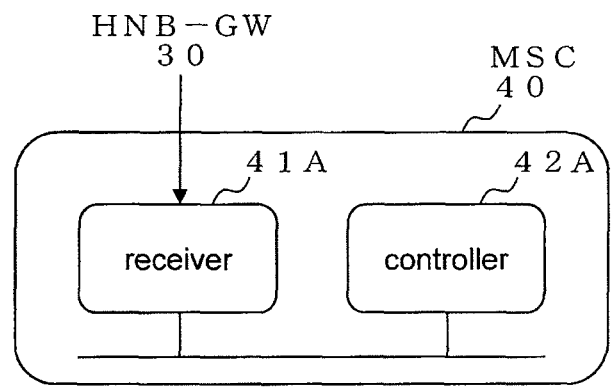
FIG. 9 is a block diagram showing a configuration of an MSC of the first exemplary embodiment.

Referring to FIG. 9, MSC 40 of this exemplary embodiment includes: receiver 41A receiving the RANAP protocol message from HNB-GW 30; and controller 42A that, when information indicating that mobile station 10 has originated a call as an emergency call is included in the RANAP protocol message, determines whether the type of the call that is actually originated by mobile station 10 is an emergency call or not, and performs a call releasing process if the type is not an emergency call.

Figure 10:
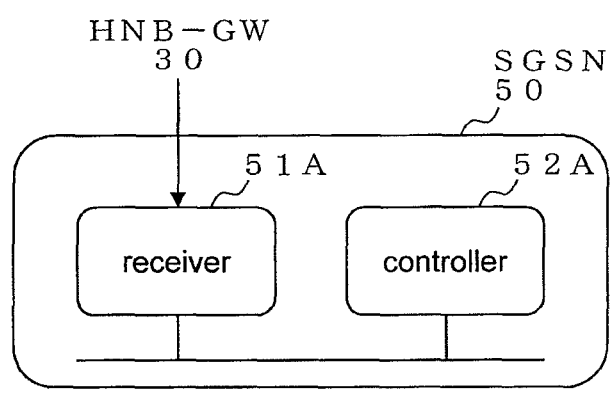
FIG. 10 is a block diagram showing a configuration of an SGSN of the first exemplary embodiment.

Referring to FIG. 10, SGSN 50 of this exemplary embodiment includes: receiver 51A receiving the RANAP protocol message from HNB-GW 30; and controller 52A that, when information indicating that mobile station 10 has originated a call as an emergency call is included in the RANAP protocol message, determines whether the type of the call that is actually originated by mobile station 10 is an emergency call or not, and performs a call releasing process if the type is not an emergency call.

Accordingly, in this exemplary embodiment, MSC 40 or SGSN 50 is capable of knowing that mobile station 10 has originated a call as an emergency call.

As a result, when mobile station 10 has falsified the Establishment Cause and misrepresented the call as an emergency call, MSC 40 or SGSN 50 can perform the call releasing process on mobile station 10. Accordingly, this can prevent a service by HNB 20 from being enjoyed in an unauthorized manner.

(Second Exemplary Embodiment)

Figure 11:
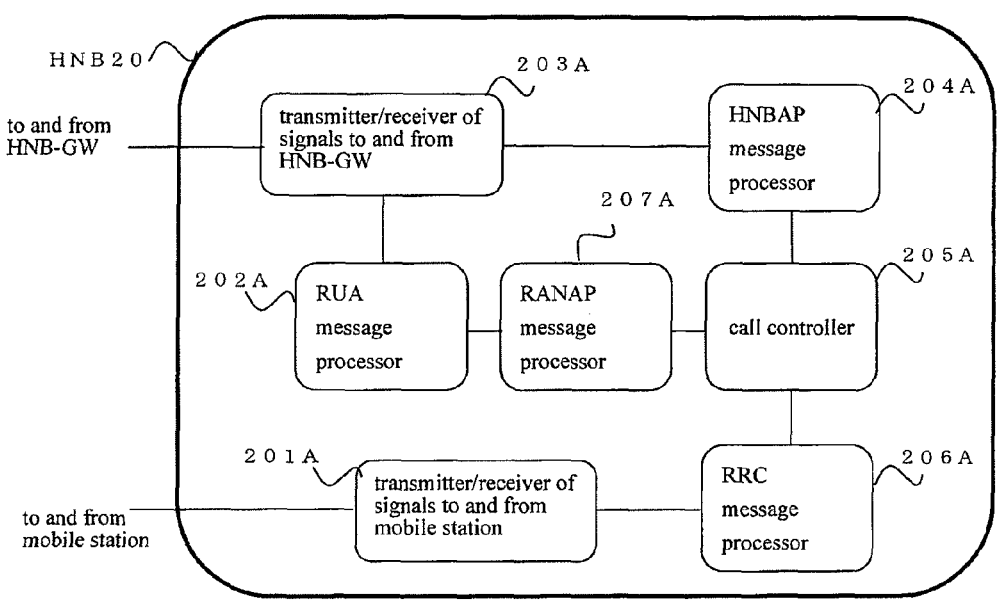
FIG. 11 is a block diagram showing a configuration of an HNB of a second exemplary embodiment.
Figure 14:
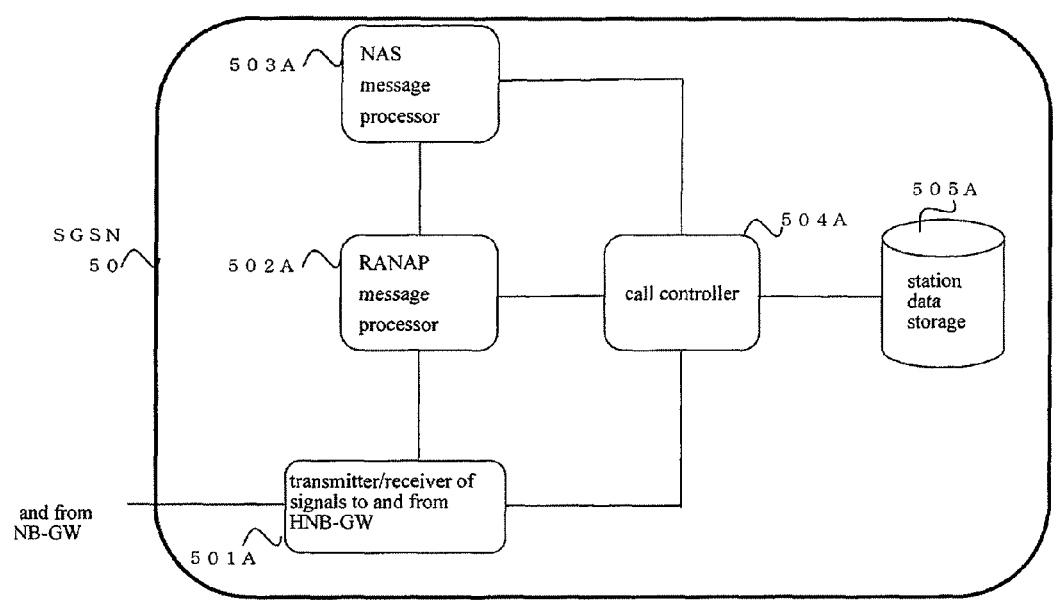
FIG. 14 is a block diagram showing a configuration of an SGSN of the second exemplary embodiment.

FIGS. 11 and 14 show configurations of HNB 20, HNB-GW 30, MSC 40, and SGSN 50 of this exemplary embodiment, respectively. This exemplary embodiment is an example where the configurations and operations of HNB 20, HNB-GW 30, MSC 40 and SGSN 50 of the first exemplary embodiment in FIGS. 7 to 10 are represented in a further specified manner.

Referring to FIG. 11, HNB 20 of this exemplary embodiment includes: transmitter/receiver 201A of signals to and from the mobile station; RUA (RANAP User Adaption) message processor 202A; transmitter/receiver 203A of signals to and from the HNB-GW; HNBAP message processor 204A; call controller 205A; RRC message processor 206A; and RANAP message processor 207A.

In FIG. 11, RUA message processor 202A, HNBAP message processor 204A, call controller 205A, RRC message processor 206A and RANAP message processor 207A configure controller 21A shown in FIG. 7. Transmitter/receiver 203A of signals to and from the HNB-GW is an example of transmitter 22A shown in FIG. 7.

Transmitter/receiver 201A of signals to and from the mobile station includes, as functions for transmitting and receiving the RRC protocol message to and from mobile station 10: a concealment function of concealing (coding and decoding) the message; a signal delivery confirmation function of confirming delivery of the message; and a signal distribution function of distributing the message.

Transmitter/receiver 203A of signals to and from the HNB-GW includes, as functions for transmitting and receiving an HNBAP protocol message or an RUA protocol message to and from HNB-GW 30: a concealment function; a signal delivery confirmation function; and a signal distribution function.

RRC message processor 206A includes: a function of encoding the RRC protocol message to be transmitted to mobile station 10; and a function of decoding the RRC protocol message received from mobile station 10.

HNBAP message processor 204A includes: a function of encoding an HNBAP protocol message to be transmitted to HNB-GW 30; and a function of decoding the HNBAP protocol message received from HNB-GW 30.

RANAP message processor 207A includes: a function of encoding an RANAP message to be transmitted to HNB-GW 30; and a function of decoding the RANAP protocol message received from HNB-GW 30.

The RUA protocol serves to transfer the RANAP protocol message. RUA message processor 202A includes: a function of encoding an RUA protocol message to be transmitted to HNB-GW 30; and a function of decoding the RUA protocol message received from HNB-GW 30.

Call controller 205A initiates various call processes, such as establishment of RRC connection, establishment of a bearer, and mobility management on the basis of the RRC protocol message and the RANAP protocol message. Further, call controller 205A initiates the HNBAP protocol and performs a process of registering mobile station 10 in HNB-GW 30. The above functions are typically included in a call controller implemented in HNB 20.

In addition thereto, call controller 205A includes a function of setting the Emergency Cause value of the RANAP protocol message to be transmitted to HNB-GW 30 on the basis of the Registration Cause parameter of the HNBAP protocol message received from HNB-GW 30, as a function specific to this exemplary embodiment.

Figure 12:
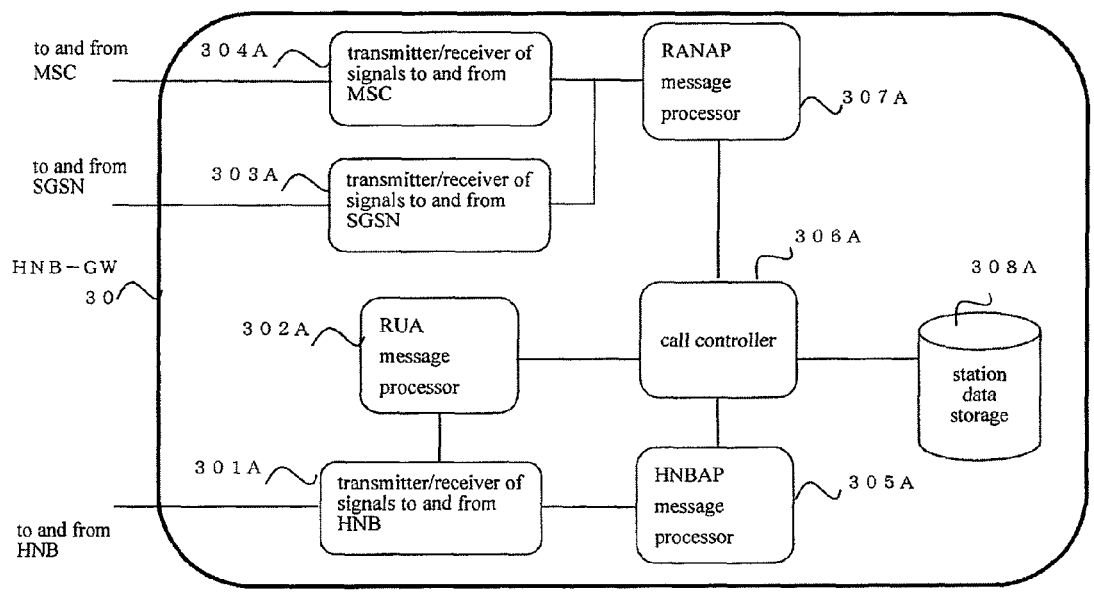
FIG. 12 is a block diagram showing a configuration of an HNB-GW of the second exemplary embodiment.

Referring to FIG. 12, HNB-GW 30 of this exemplary embodiment includes: transmitter/receiver 301A of signals to and from the HNB; RUA message processor 302A; transmitter/receiver 303A of signals to and from the SGSN; transmitter/receiver 304A of signals to and from the MSC; HNBAP message processor 305A; call controller 306A; RANAP message processor 307A; and station data storage 308A.

In FIG. 12, RUA message processor 302A, HNBAP message processor 305A, call controller 306A, RANAP message processor 307A and station data storage 308A configure controller 32A shown in FIG. 8. Transmitter/receiver 301A of signals to and from the HNB is an example of receiver 31A shown in FIG. 8. Transmitter/receiver 303A of signals to and from the SGSN, and transmitter/receiver 304A of signals to and from the MSC are examples of transmitter 33A shown in FIG. 8.

Transmitter/receiver 301A of signals to and from the HNB includes, as functions for transmitting and receiving the RUA protocol message and the HNBAP protocol message to and from HNB 20: a concealment function and a signal delivery confirmation function.

Transmitter/receiver 304A of signals to and from the MSC includes, as functions for transmitting and receiving the RANAP protocol message to and from MSC 40: a sequence control function of controlling a sequence of messages; and a delivery confirmation function.

Transmitter/receiver 303A of signals to and from the SGSN includes, as functions for transmitting and receiving the RANAP protocol message to and from SGSN 50: a delivery confirmation function; and a sequence control function.

HNBAP message processor 305A includes: a function of encoding the HNBAP protocol message to be transmitted to HNB 20; and a function of decoding the HNBAP protocol message received from the HNB.

RUA message processor 302A includes: a function of encoding the RUA protocol message to be transmitted to HNB 20; and a function of decoding the RUA protocol message received from HNB 20.

RANAP message processor 307A includes a function of encoding the RANAP protocol message to be transmitted to MSC 40; and a function of decoding the RANAP protocol message received from MSC 40.

Call controller 306A performs a process of registering HNB 103, and a process of registering mobile station 10. Call controller 306A is capable of accessing station data stored in station data storage 308A. In the station data, a list of the accessible IMSI is set for each CSG. HNB-GW 30 regulates access to HNB 20 on the basis of this IMSI list. The above functions are typically included in a call controller implemented in HNB-GW 30.

Figure 13:
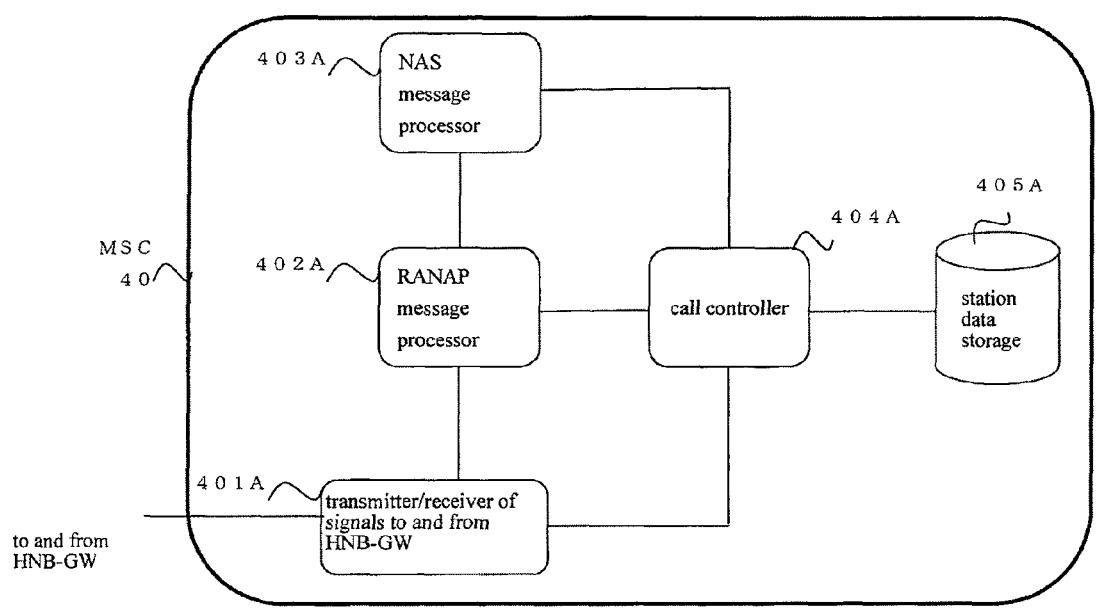
FIG. 13 is a block diagram showing a configuration of an MSC of the second exemplary embodiment.

Referring to FIG. 13, MSC 40 of this exemplary embodiment includes: transmitter/receiver 401A of signals to and from the HNB-GW; RANAP message processor 402A; NAS (Non Access Stratum) message processor 403A; call controller 404A; and station data storage 405A.

In FIG. 13, RANAP message processor 402A, NAS message processor 403A, call controller 404A, and station data storage 405A configure controller 42A shown in FIG. 9. Transmitter/receiver 401A of signals to and from the HNB-GW is an example of receiver 41A shown in FIG. 9.

Transmitter/receiver 401A of signals to and from the HNB-GW includes, as functions for transmitting and receiving the RANAP protocol message to and from HNB-GW 30: a delivery confirmation function and a sequence control function.

RANAP message processor 402A includes: a function of encoding RANAP message to be transmitted to HNB-GW 30; and a function of decoding the RANAP protocol message received from HNB-GW 30.

NAS message processor 403A includes a function of transmitting and receiving NAS protocol (CC (Call Control) protocol and MM (Mobility Management) protocol) message to and from mobile station 10.

Call controller 404A includes: a call processing of function performing call processes, such as call establishment and call releasing; a mobility management function of performing mobility management, such as location registration and handover; and further an access regulation function of regulating access to HNB 20. Call controller 404A is capable of accessing station data stored in station data storage 405A. In the station data, a list of the accessible IMSI is set for each CSG. MSC 40 regulates access to HNB 20 on the basis of this IMSI list. The above function is a function typically included in the call controller implemented in MSC 40.

In addition thereto, call controller 404A includes, as a function specific to this exemplary embodiment: a function of analyzing the NAS message and determining whether the type of the call that is originated by mobile station 10 is the an emergency call or not when the Emergency Cause parameter is set in the RANAP protocol message received from HNB-GW 30. If the call is not emergency call, call controller 404A performs the call releasing process.

Referring to FIG. 14, SGSN 50 of this exemplary embodiment includes: transmitter/receiver 501A of signals to and from the HNB-GW; RANAP message processor 502A; NAS message processor 503A; call controller 504A; and station data storage 505A.

In FIG. 14, RANAP message processor 502A, NAS message processor 503A, call controller 504A and station data storage 505A configure controller 52A shown in FIG. 10. Transmitter/receiver 501A of signals to and from the HNB-GW is an example of receiver 51A shown in FIG. 10.

Transmitter/receiver 501A of signals to and from the HNB-GW includes, as functions for transmitting and receiving the RANAP protocol message to and from HNB-GW 30: a delivery confirmation function; and sequence control function.

RANAP message processor 502A includes: a function of encoding the RANAP message to be transmitted to HNB-GW 30; and a function of decoding the RANAP protocol message received from HNB-GW 30.

NAS message processor 503A includes a function of transmitting and receiving NAS protocol (CC protocol and MM protocol) message to and from mobile station 10.

Call controller 504A includes: a call processing function; a mobility management function; and further, an access regulation function. Call controller 504A is capable of accessing the station data stored in station data storage 505A. In the station data a list of the accessible IMSI is set for each CSG. SGSN 50 regulates access to HNB 20 on the basis of this IMSI list. The above functions are typically included in the call controller implemented in SGSN 50.

In addition thereto, call controller 504A includes, as a function specific to this exemplary embodiment, a function of analyzing the NAS message and determining whether the call that is originated from mobile station 10 is an emergency call or not when the Emergency Cause parameter is set in the RANAP protocol message received from the HNB-GW 30. If the call is not an emergency call, call controller 504A performs the call releasing process.

An operation of the mobile communication system of this exemplary embodiment will hereinafter be described.

(A) A case of a Circuit Switching Call

Figure 15:
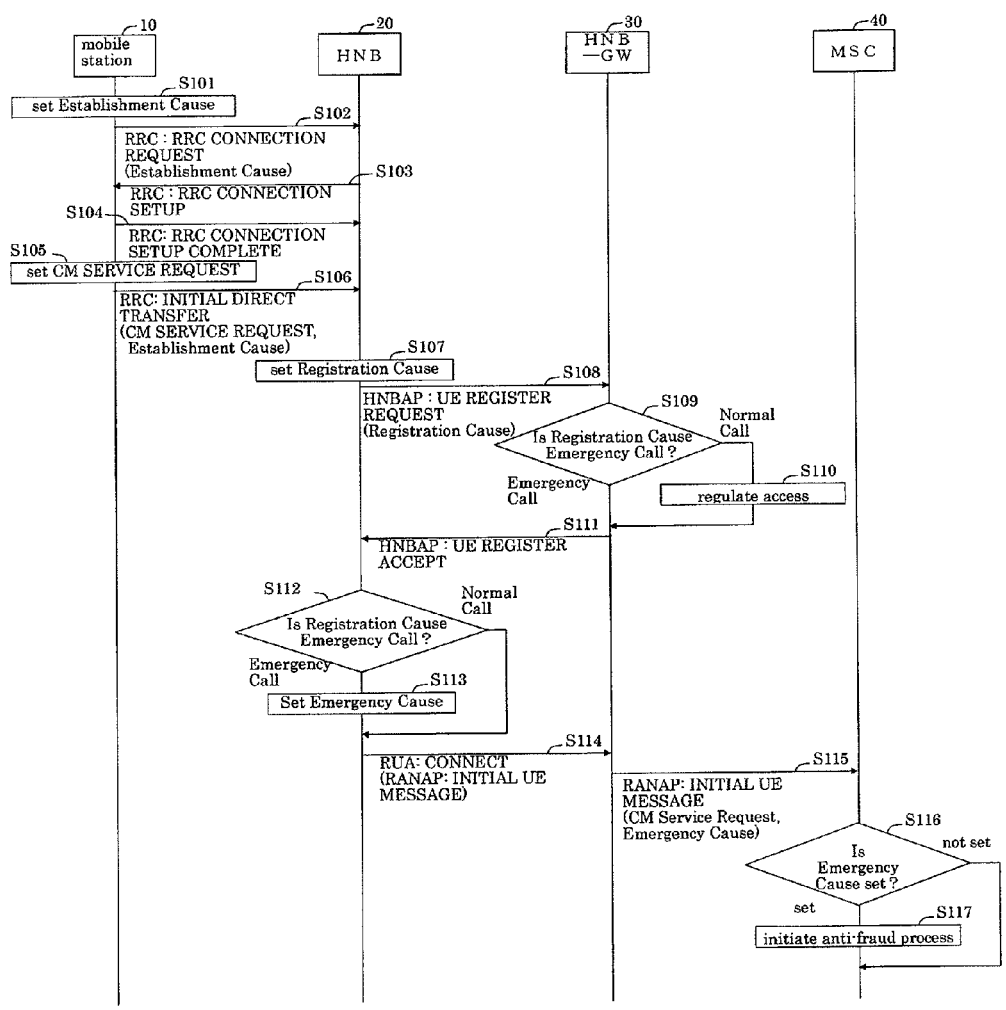
FIG. 15 is a sequence diagram illustrating an operation of a mobile communication system of the second exemplary embodiment.

First, an operation example of a case where mobile station 10 originates a call as a circuit switching emergency call is described along with a sequence diagram of FIG. 15.

Referring to FIG. 15, mobile station 10 in step S101 sets the Establishment Cause (FIG. 4) to be the RRC: RRC CONNECTION REQUEST message (FIG. 2); and in step S102 transmits the RRC: RRC CONNECTION REQUEST message to HNB 20.

After establishment of wireless resources, in step S103, HNB 20 notifies mobile station 10 of this by means of an RRC: RRC CONNECTION SETUP message.

After establishment of an RRC connection, in step S104, mobile station 10 notifies HNB 20 of this by means of an RRC: RRC CONNECTION SETUP COMPLETE message.

Subsequently, in step S105, mobile station 10 sets the CM Service Type parameter (FIG. 17) of the CM SERVICE REQUEST message (FIG. 16), which is the MM protocol message, to be "Emergency call establishment", and includes the CM SERVICE REQUEST message into the RRC: INITIAL DIRECT TRANSFER message (FIG. 3).

Further, in step S106, mobile station 10 sets the Establishment Cause (FIG. 4) of the RRC: INITIAL DIRECT TRANSFER message to be "Emergency Call", and transmits the RRC: INITIAL DIRECT TRANSFER message (FIG. 3) to HNB 20.

In HNB 20, RRC protocol message processor 707A decodes the RRC: RRC CONNECTION REQUEST message transmitted in step S102, and the RRC: INITIAL DIRECT TRANSFER message transmitted in step S106.

Further, in HNB 20, call controller 205A stores the Establishment Cause value (FIG. 4) transmitted from mobile station 10 by means of an RRC: RRC CONNECTION REQUEST message and the RRC: INITIAL DIRECT TRANSFER message; and in step S107 determines the Registration Cause parameter on the basis of the Establishment Cause value and sets the parameter in the HNBAP: UE REGISTER REQUEST message (FIG. 5).

Figure 18:
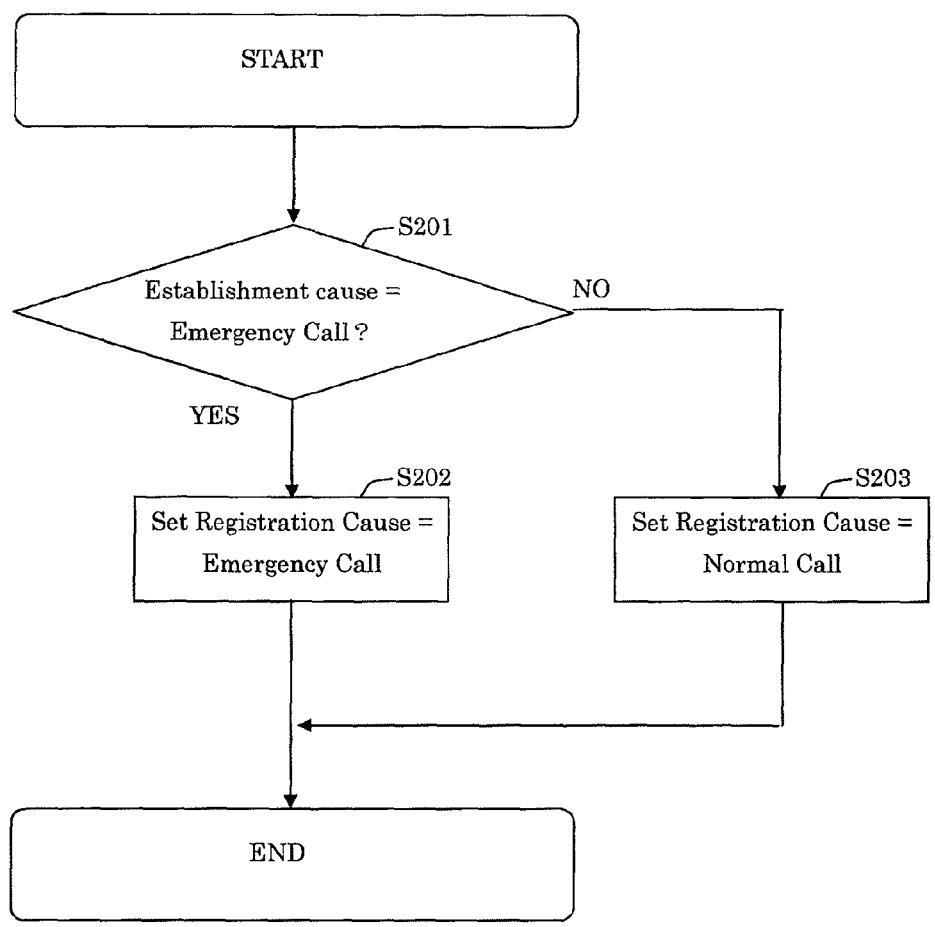
FIG. 18 is a flowchart showing a process of determining a Registration Cause parameter by the HNB.

FIG. 18 shows a flowchart of a process of determining the Registration Cause parameter.

Referring to FIG. 18, call controller 205A in step S201 determines whether the Establishment Cause value is the "Emergency Call" or not; when the value is the "Emergency Call", in step S202 call controller 205A determines the Registration Cause parameter to be the "Emergency Call"; when the value is not "Emergency Call", in step S203 call controller 205A determines that the Registration Cause parameter is the "Normal Call".

Referring again to FIG. 15, in step S108, HNB 20 transmits the HNBAP: UE REGISTER REQUEST message (FIG. 5) set with the Registration Cause parameter to HNB-GW 30.

In HNB-GW 30, transmitter/receiver 301A of signals to and from the HNB receives the HNBAP: UE REGISTER REQUEST message. HNBAP message processor 305A decodes the HNBAP: UE REGISTER REQUEST message. In step S109, call controller 306A determines whether to perform the access regulation (step S110) or not on the basis of the Registration Cause parameter set in the HNBAP: UE REGISTER REQUEST message.

If the Registration Cause parameter is "Emergency Call", HNB-GW 30 does not regulate access. In this case, call controller 306A assigns a context ID to applicable mobile station 10; HNBAP message processor 305A encodes the HNBAP: UE REGISTER ACCEPT message; and in step S111 transmitter/receiver 301A of signals to and from the HNB transmits the HNBAP: UE REGISTER ACCEPT message to HNB 20.

In HNB 20, after reception of the HNBAP: UE REGISTER ACCEPT message, in step S112, call controller 205A determines whether the Registration Cause parameter is "Emergency Call" or not; if the parameter is "Emergency Call", in step S113 call controller 205A generates an Emergency Cause parameter, which is introduced in the present invention (FIG. 19). RANAP message processor 207A encodes the RANAP: INITIAL UE MESSAGE message including the Emergency Cause parameter. Further, RANAP message processor 207A sets an NAS-PDU (Protocol Data Unit) parameter to the RANAP: INITIAL UE MESSAGE message, and sets the CM SERVICE REQUEST message of the MM protocol received from mobile station 10 to the NAS-PDU parameter. RUA message processor 703A generates an RUA: CONNECT message including the RANAP: INITIAL UE MESSAGE message. That is, in step S114, the RANAP: INITIAL UE MESSAGE message is transmitted from HNB 20 to HNB-GW 30 by means of RUA: CONNECT message.

In HNB-GW 30, RUA message processor 302A decodes the CONNECT message of the RUA protocol. Call controller 306A extracts the RANAP: INITIAL UE MESSAGE message that has already been encoded in HNB 20. In step S115, RANAP message processor 307A transmits the RANAP: INITIAL UE MESSAGE message to MSC 40 on the basis of routing information, such as a CN Domain ID.

In MSC 40, RANAP message processor 402A decodes the RANAP: INITIAL UE MESSAGE message. Further, NAS message processor 403A decodes the CM SERVICE REQUEST message set in the NAS-PDU. These decoded results are notified to call controller 404A. In step S116, call controller 404A determines whether the Emergency Cause parameter, which is introduced in the present invention, is set or not. If the Emergency Cause parameter is set, in step S117, call controller 404A initiates an anti-fraud process dedicated to the CS (Circuit Switching) service.

Figure 20:
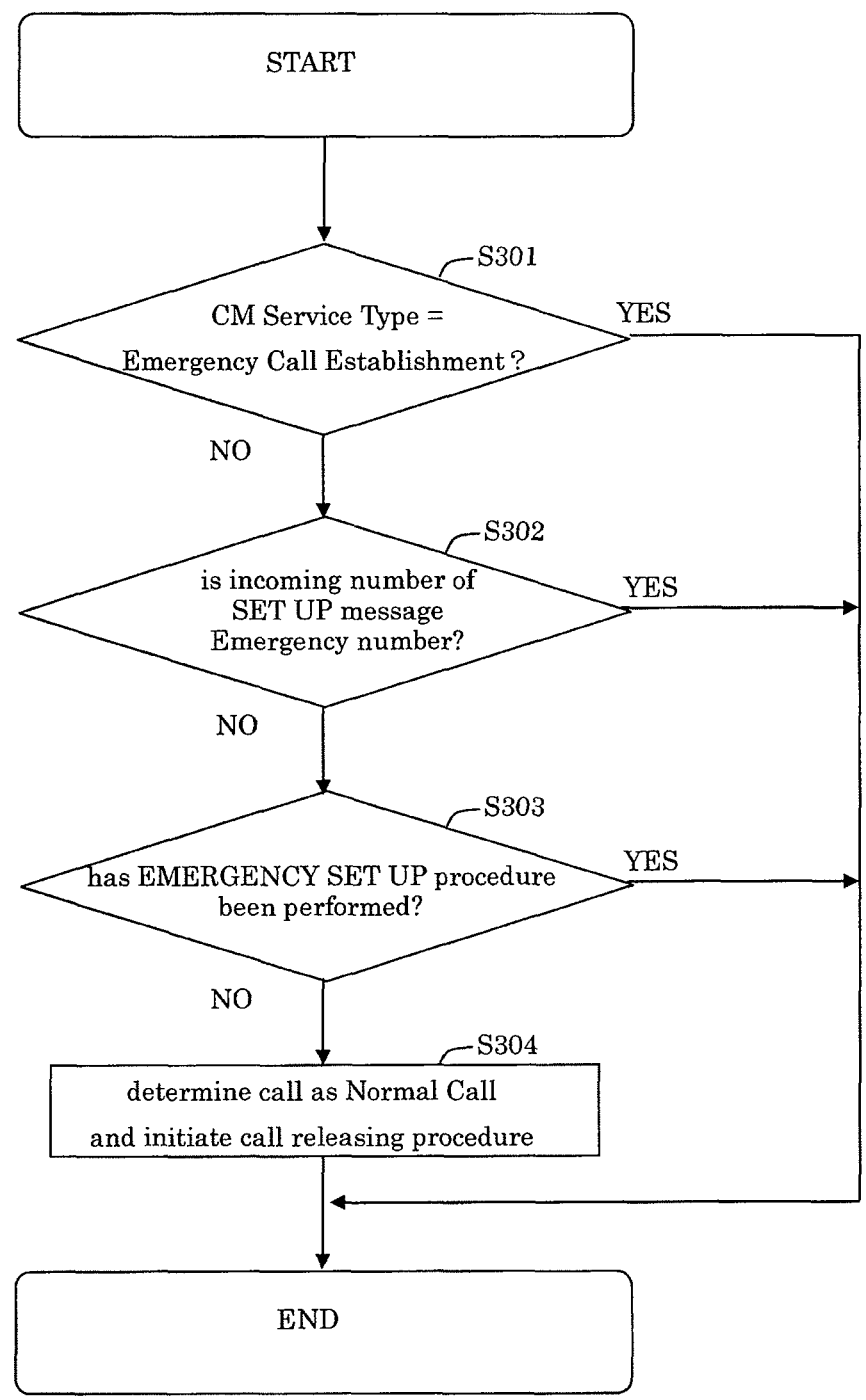
FIG. 20 is a flowchart showing an anti-fraud process by the MSC of the second exemplary embodiment.

FIG. 20 shows a flowchart of the anti-fraud process dedicated to the CS service.

Referring to FIG. 20, in step S301, call controller 404A checks whether the CM Service Type parameter (TS24.008 Ver 8.5.0 Section 10.5.3.3) set in the CM SERVICE REQUEST message (TS24.008 Ver 8.5.0 Section 9.2.9) of the MM protocol transmitted from mobile station 10 is "Emergency Call Establishment" or not.

Next, in step S302, call controller 404A checks whether a telephone number (TS24.008 Ver 8.5.0 Section 10.5.4.7) of the SETUP (TS24.008 Ver 8.5.0 Section 9.3.23 Setup) message of the CC protocol, which is an originating signal transmitted from MSC 40, is an emergency number or not. More specifically, in FIG. 10.5.91/3GPP TS 24.008 Called party BCD number information element of TS24.008 Ver 8.5.0, Number digit 1, Number digit 2, Number digit 3 and the like correspond to the telephone number. A check is made to determine whether these telephone numbers are emergency numbers or not. Called Party BCD Number in Section 10.5.4.7 of TS24.008 indicates the incoming number. BCD (BCD; Binary-coded decimal) is a representation form of a numerical value in a computer, and indicates what represents one digit in a decimal notation as four binary numbers, each of which represents one of 0 to 9.

Next, in step S303, call controller 404A checks whether the EMERGENCY SETUP procedure (TS24.008 Ver 8.5.0 Section 9.3.8) is performed in mobile station 10 or not. For example, on reception of a message for initiating "emergency call establishment" from mobile station 10, call controller 404A checks whether the EMERGENCY SETUP procedure is performed or not from information element "Emergency setup message type".

If any one of checks in steps S301 to S303 matches, call controller 404A determines that the call type is an emergency call, and continues the call process for the emergency call. On the other hand, if none of the checks matches, in step S304, call controller 404A determines that the call type is a normal call, determines that it is unauthorized mobile station 10-2 and initiates the call releasing process.

This can prevent unauthorized mobile station 10-2 originally inaccessible to HNB 20 from falsifying the Establishment Cause, misrepresenting the call as an emergency call and enjoying the service by HNB 20.

(B) A Case of a Packet Switching Call

Next, an operation example in a case where mobile station 10 originates a call as a packet switching emergency call will be described.

The operation sequence of the case of the packet switching call is the same as in the above case except that the processes performed in MSC 40 in the case of the circuit switching call are performed in SGSN 50. However, in the packet switching, an SM (Session Management) protocol message and a GMM (GPRS Mobility Management) protocol message are applied as NAS messages. Accordingly, the anti-fraud process initiated in step S117 is an anti-fraud process dedicated to PS (Packet Switching) service. The method in this process for identifying an emergency call is different from the method of the CS service. Further, in a case where audio is used for packet switching, a VoIP (Voice over IP) method is used. The GMM is a protocol for Mobility Management in the packet service (PS).

Figure 21:
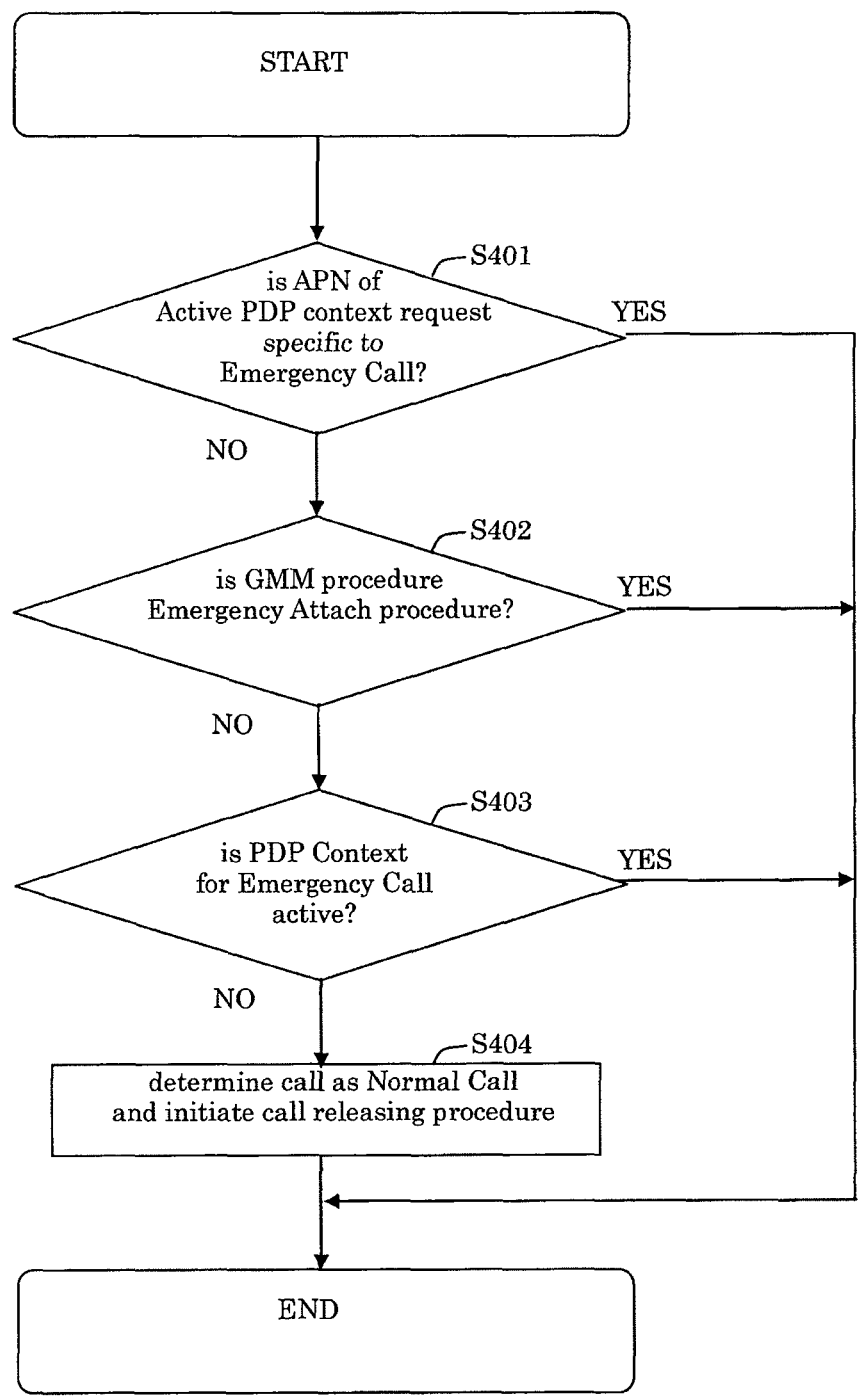
FIG. 21 is a flowchart showing an anti-fraud process by the SGSN of the second exemplary embodiment.

FIG. 21 shows a flowchart of the anti-fraud process dedicated to the PS service.

Referring to FIG. 21, in step S401, call controller 504A of SGSN 50 checks whether an APN(Access Point Name) (3GPP TS24.008 9.5.1 10.5.6.1) set in the Activate PDP (Packet Data Protocol) context request message (3GPP TS24.008 Ver 8.5.0 Section 9.5.1) of the SM protocol transmitted from mobile station 10 is specific to the emergency call or not.

Next, in step S402, call controller 504A checks whether an GMM procedure performed in mobile station 10 is an Emergency Attach procedure (TR23.869 Ver 9.0.0) or not.

Next, in step S403, call controller 504A checks whether a PDP Context active in SGSN 50 is a PDP Context dedicated to the emergency call or not. For example, call controller 504A checks whether the PDP Context active in SGSN 50 is an emergency PDP Context in TR23.869 Ver 9.0.0 or not.

If any one of checks in steps S401 to S403 matches, call controller 504A determines that the call type is an emergency call, and continues the call process for the emergency call. On the other hand, if none of the checks matches, in step S504, call controller 504A determines that the call type is a normal call, determines that it is unauthorized mobile station 10-2 and initiates the call releasing process.

Also in the case of the packet switching VoIP, this can prevent unauthorized mobile station 10-2 originally inaccessible to HNB 20 from falsifying the Establishment Cause, misrepresenting the call as an emergency call and enjoying the service by HNB 20.

(Third Exemplary Embodiment)

Figure 22:
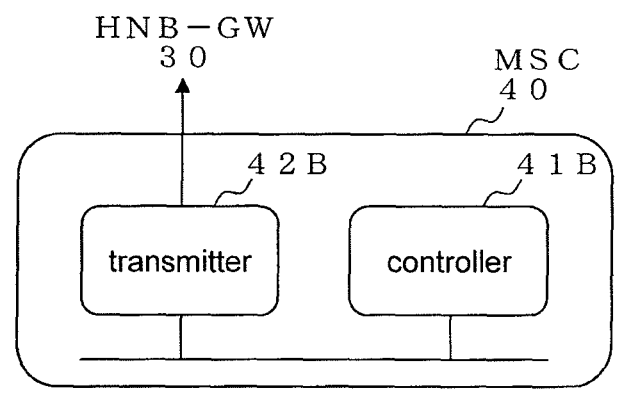
FIG. 22 is a block diagram showing a configuration of an MSC of a third exemplary embodiment.
Figure 23:
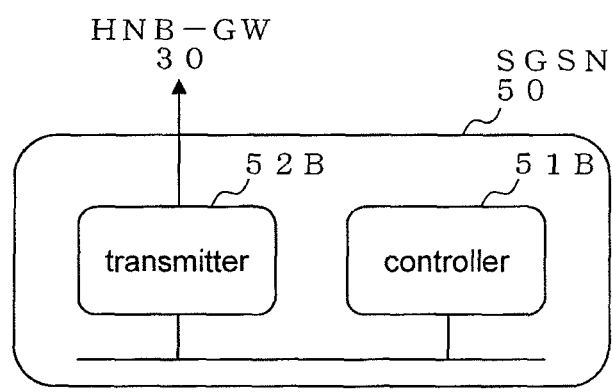
FIG. 23 is a block diagram showing a configuration of an SGSN of the third exemplary embodiment.
Figure 24:
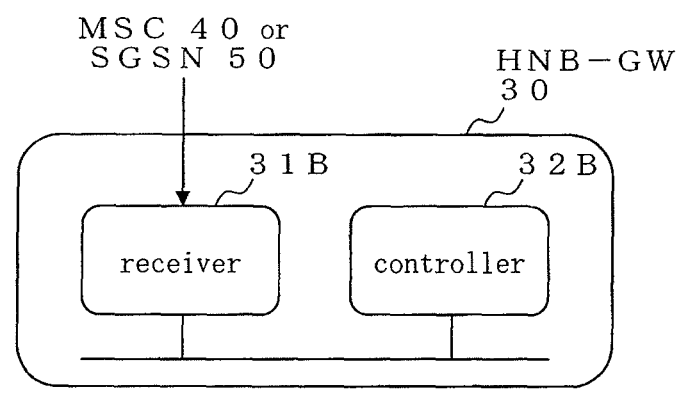
FIG. 24 is a block diagram showing a configuration of an HNB-GW of the third exemplary embodiment.

FIGS. 22 to 24 show configurations of MSC 40, SGSN 50 and HNB-GW 30 of this exemplary embodiment, respectively.

Referring to FIG. 22, MSC 40 of this exemplary embodiment includes: controller 41B that determines whether the type of a call that is actually originated by mobile station 10 is an emergency call or not and includes information representing that the call type is an emergency call in the RANAP protocol message; and transmitter 42B that transmits the RANAP protocol message to HNB-GW 30.

Referring to FIG. 23, SGSN 50 of this exemplary embodiment includes: controller 51B that determines whether the type of a call that is actually originated by mobile station 10 is an emergency call or not and includes information representing that the call type is an emergency call in the RANAP protocol message; and transmitter 52B that transmits the RANAP protocol message to HNB-GW 30.

Referring to FIG. 24, HNB-GW 30 of this exemplary embodiment includes: receiver 31B that receives the RANAP protocol message from MSC 40 or SGSN 50; and controller 32B that performs the call releasing process when the information representing that the call type is an emergency call is included in the RANAP protocol message.

Accordingly, in this exemplary embodiment, HNB-GW 30 is capable of knowing that the type of the call that is actually originated by mobile station 10 is an emergency call.

As a result, when mobile station 10 has falsified the Establishment Cause and misrepresented the call as an emergency call, HNB-GW 30 can perform the call releasing process on mobile station 10. Accordingly, this can prevent a service by HNB 20 from being enjoyed in an unauthorized manner.

(Fourth Exemplary Embodiment)

Figure 25:
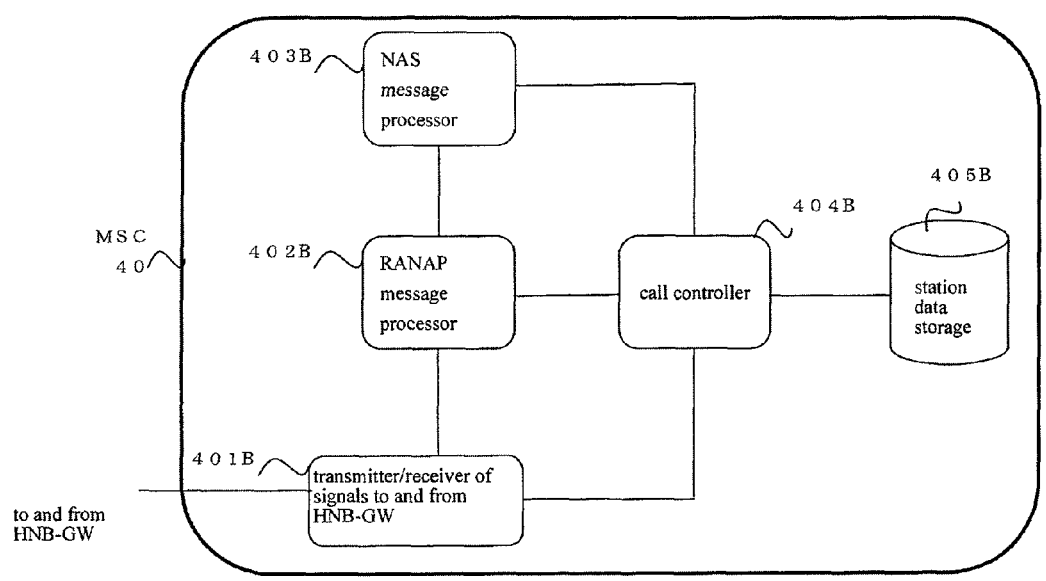
FIG. 25 is a block diagram showing a configuration of an MSC of a fourth exemplary embodiment.
Figure 26:
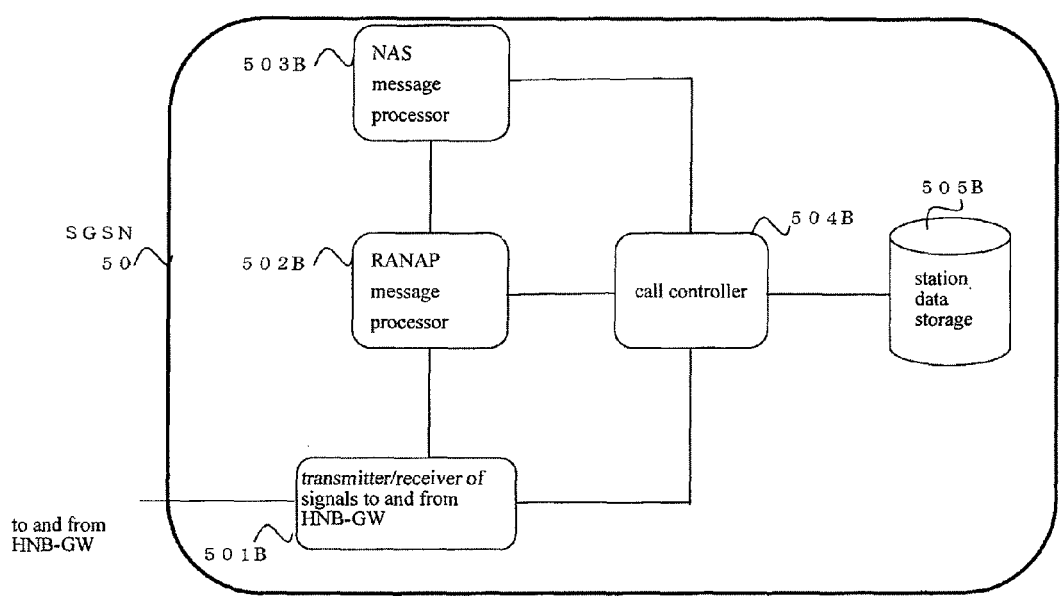
FIG. 26 is a block diagram showing a configuration of an SGSN of a fourth exemplary embodiment.
Figure 27:
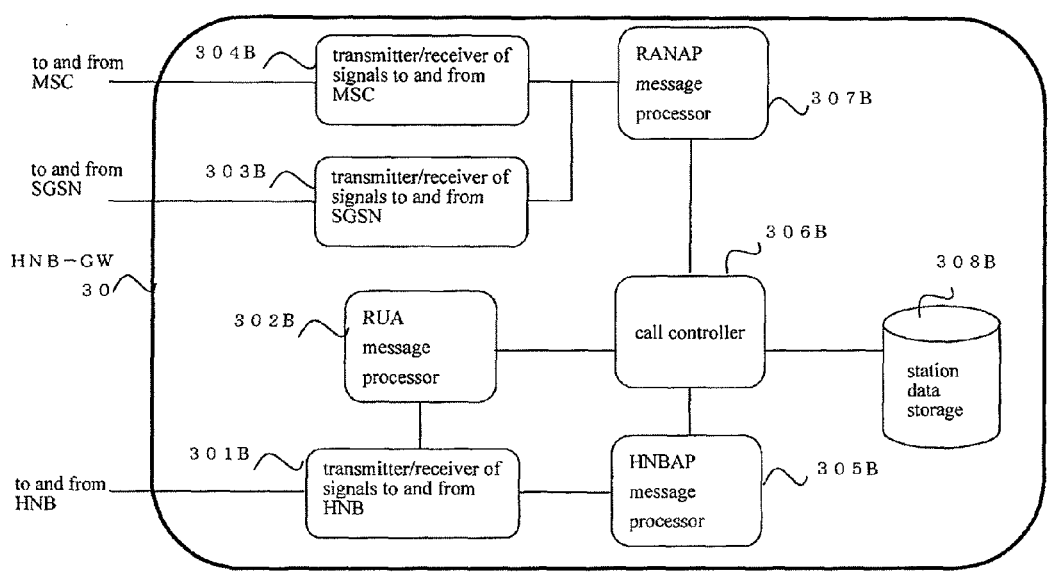
FIG. 27 is a diagram showing a configuration of an HNB-GW of a fourth exemplary embodiment.

FIGS. 25 to 27 show configurations of MSC 40, SGSN 50 and HNB-GW 30 of this exemplary embodiment, respectively. This exemplary embodiment is an example where the configurations and operations of SC 40, SGSN 50 and HNB-GW 30 of the third exemplary embodiment in FIGS. 22 to 24 are represented in a further specified manner.

Referring to FIG. 25, MSC 40 of this exemplary embodiment includes: transmitter/receiver 401B of signals to and from HNB-GW; RANAP message processor 402B; NAS message processor 403B; call controller 404B; and station data storage 405B.

In FIG. 25, RANAP message processor 402B, NAS message processor 403B, call controller 404B and station data storage 405B configure controller 41B shown in FIG. 22. Transmitter/receiver 401B of signals to and from the HNB-GW is an example of transmitter 42B shown in FIG. 22.

Transmitter/receiver 401B of signals to and from HNB-GW, RANAP message processor 402B, NAS message processor 403B and station data storage 405B include functions analogous to those of transmitter/receiver 401A of signals to and from the HNB-GW, RANAP message processor 402A, NAS message processor 403A and station data storage 405A shown in FIG. 13, respectively.

Call controller 404B includes a function typically included in the call controller implemented in MSC 40 as with call controller 404A shown in FIG. 13.

In addition thereto, call controller 404B includes, as a function specific to this exemplary embodiment, a function of analyzing the NAS message, determining whether the type of the call that is actually originated by mobile station 10 is an emergency call or not, and setting Call Type parameter of the RANAP protocol message to be transmitted to HNB-GW 30 on the basis of the determined result.

Referring to FIG. 26, SGSN 50 of this exemplary embodiment includes: transmitter/receiver 501B of signals to and from the HNB-GW; RANAP message processor 502B; NAS message processor 503B; call controller 504B; and station data storage 505B.

In FIG. 26, RANAP message processor 502B, NAS message processor 503B, call controller 504B and station data storage 505B configure controller 51B shown in FIG. 23. Transmitter/receiver 501 B of signals to and from the HNB-GW is an example of transmitter 52B shown in FIG. 23.

Transmitter/receiver 501B of signals to and from the HNB-GW signal, RANAP message processor 502B, NAS message processor 503B and station data storage 505B include functions analogous to those of transmitter/receiver 501A of signals to and from HNB-GW, RANAP message processor 502A, NAS message processor 503A and station data storage 505A shown in FIG. 14, respectively.

Call controller 504B includes a function typically included in the call controller implemented in SGSN 50, as with call controller 504A shown in FIG. 14.

In addition thereto, call controller 504B includes, as a function specific to this exemplary embodiment, a function of analyzing the NAS message, determining whether the type of the call that is actually originated by mobile station 10 is an emergency call or not, and setting Call Type parameter of the RANAP protocol message to be transmitted to HNB-GW 30 on the basis of the determined result.

Referring to FIG. 27, HNB-GW 30 of this exemplary embodiment includes: transmitter/receiver 301B of signals to and from HNB; RUA message processor 302B; transmitter/receiver 303B of signals to and from the SGSN; transmitter/receiver 304B of signals to and from the MSC; HNBAP message processor 305B; call controller 306B; RANAP message processor 307B; and station data storage 308B.

In FIG. 27, RUA message processor 302B, HNBAP message processor 305B, call controller 306B, RANAP message processor 307B and station data storage 308B configure controller 32B shown in FIG. 24. Transmitter/receiver 303B of signals to and from the SGSN and transmitter/receiver 304B of signals to and from the MSC are examples of receiver 31B shown in FIG. 24.

Transmitter/receiver 301B of signals to and from HNB, RUA message processor 302B, transmitter/receiver 303B of signals to and from the SGSN, transmitter/receiver 304B of signals to and from the MSC, HNBAP message processor 305B, RANAP message processor 307B and station data storage 308B include functions analogous to those of transmitter/receiver 301A of signals to and from the HNB, RUA message processor 302A, transmitter/receiver 303A of signals to and from the SGSN, transmitter/receiver 304A of signals to and from the MSC, HNBAP message processor 305A, RANAP message processor 307A and station data storage 308A shown in FIG. 12, respectively.

Call controller 306B includes a function typically included in the call controller implemented in HNB-GW 30 as with call controller 306A shown in FIG. 12.

In addition thereto, call controller 306B includes, as a function specific to this exemplary embodiment, a function that, when the Call Type parameter of the RANAP protocol message that is received from MSC 40 or SGSN 50 is set to be a Normal Call, determines that the type of call that is originated by mobile station 10 is a normal call, and performs the call releasing process if mobile station 10 has originated the call as the emergency call.

The configuration of HNB 20 of this exemplary embodiment may be analogous to that in FIG. 9. Note that call controller 205A of HNB 20 is required to have a function typically included in the call controller implemented in HNB 20.

Operations of the mobile communication system of this exemplary embodiment will hereinafter be described.

(1) Operation Example 1

This operation example is an example where the determination result of the call type determined in MSC 40 or SGSN 50 is notified by means of a COMMON ID message of RANAP (3GPP TS25.413).

(1-A) A Case of a Circuit Switching Call

Figure 28:
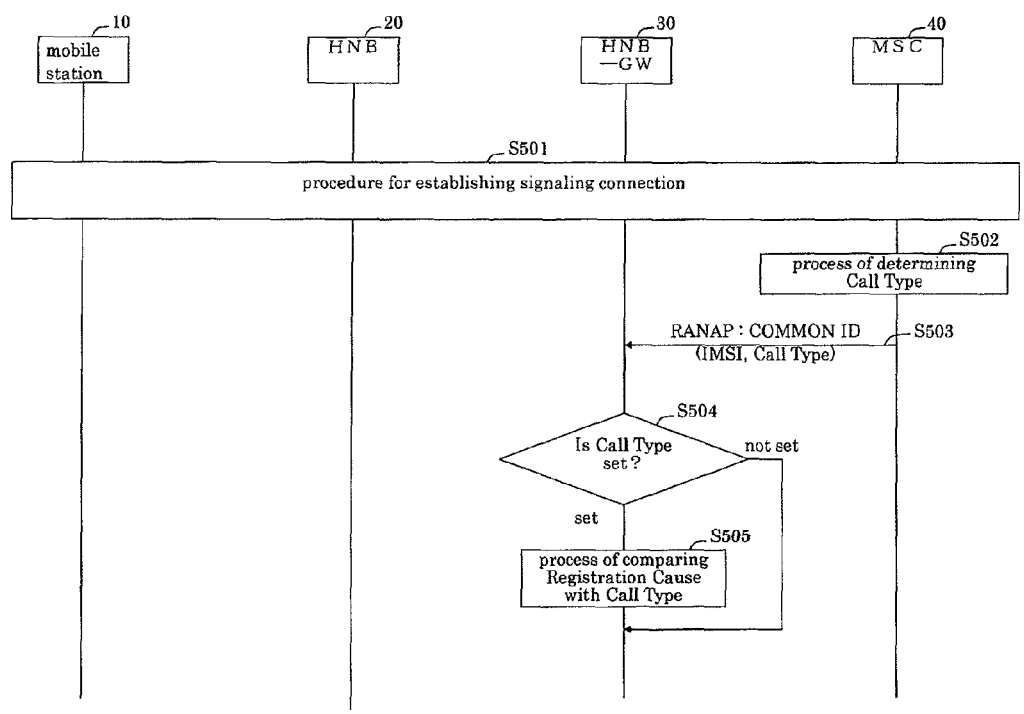
FIG. 28 is a sequence diagram illustrating an operation example 1 of a mobile communication system of the fourth exemplary embodiment.

First, an operation example of a case where MSC 40 notifies the determination result of the call type of the circuit switching call by means of a COMMON ID message of the RANAP is described along with a sequence diagram of FIG. 28. FIG. 28 shows an operation after completion of the process shown in FIG. 15. However, the processes in steps S112, S113, S116 and S117 shown in FIG. 15 are not performed. Further, the Emergency Cause parameter is not included in the RANAP: INITIAL UE MESSAGE message transmitted in steps S114 and S115.

Typically, as described in 3GPP TS25.413, core network apparatus transmits an RANAP: COMMON ID message to HNB-GW 30 after establishment of a signaling connection.

Accordingly, referring to FIG. 28, in MSC 40, in step S501 call controller 404B establishes the signaling connection, and subsequently in step S502 initiates a process of determining the Call Type parameter.

Figure 29:
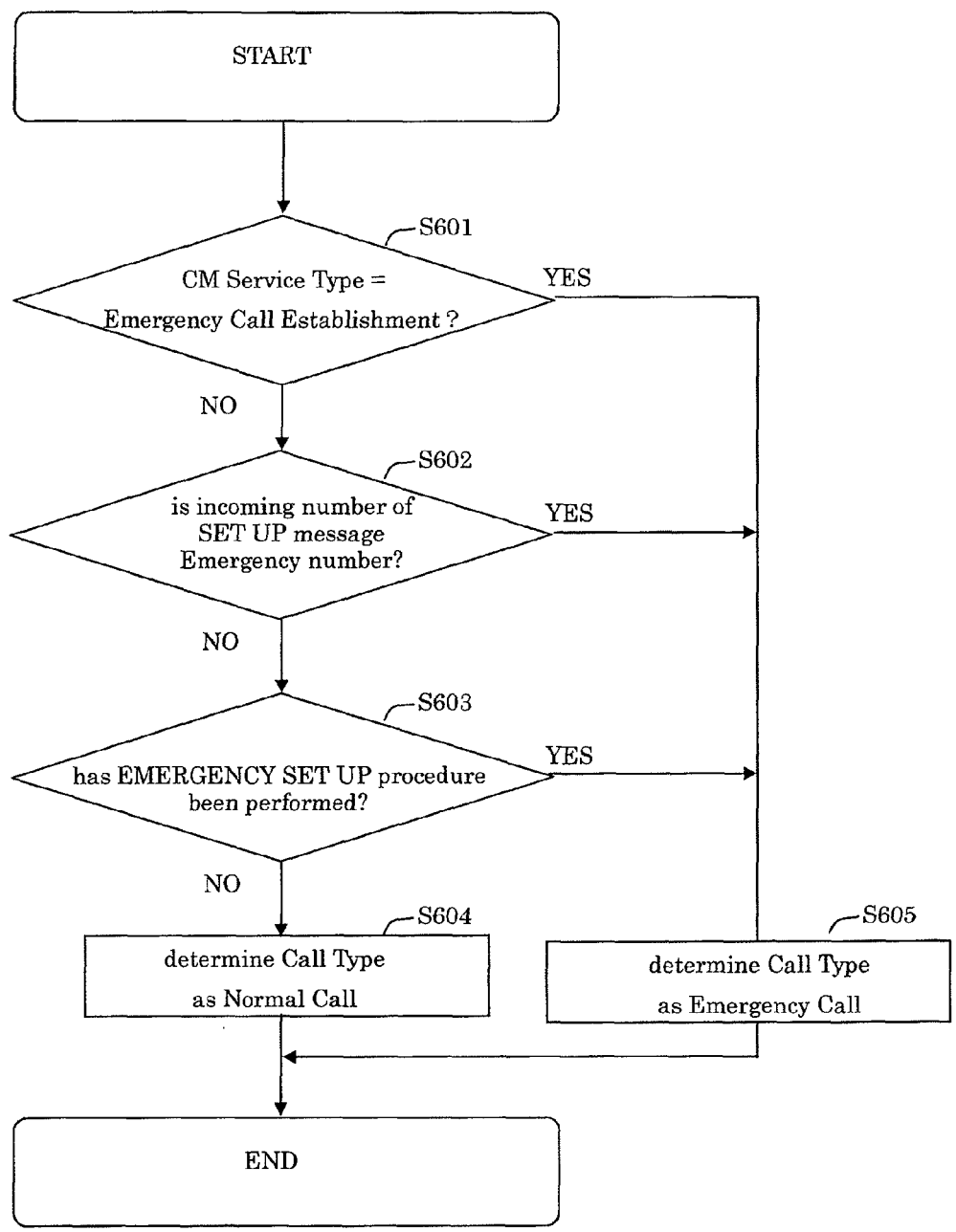
FIG. 29 is a flowchart of a process of determining a call type parameter by the MSC of the fourth exemplary embodiment.

FIG. 29 shows a flowchart of the process of determining the Call Type parameter in MSC 40.

Referring to FIG. 29, in step S601, call controller 404B checks whether the CM Service Type parameter (TS24.008 Ver 8.5.0 Section 10.5.3.3) set in the CM SERVICE REQUEST message (TS24.008 Ver 8.5.0 Section 9.2.9) of the MM protocol transmitted from mobile station 10 is "Emergency Call Establishment" or not.

Next, in step S602, call controller 404B checks whether the telephone number (TS24.008 Ver 8.5.0 Section 10.5.4.7) of the SETUP (TS24.008 9.3.23 Ver 8.5.0 Section Setup) message of the CC protocol, which is an originating call signal transmitted by MSC 40, is an emergency number or not. More specifically, in FIG. 10.5.91/3GPP TS 24.008 Called party BCD number information element of TS24.008 Ver 8.5.0, Number digit 1, Number digit 2, Number digit 3 and the like correspond to the telephone number, and call controller 404B checks whether the telephone number is an emergency number or not. The Called Party BCD Number in TS24.008 Section 10.5.4.7 indicates an incoming number. BCD is a representation form of a numerical value in a computer, and indicates what represents one digit in a decimal notation as four binary numbers, each of which represents one of 0 to 9.

Next, in step S603, call controller 404B checks whether an EMERGENCY SETUP procedure (TS24.008 Ver 8.5.0 Section 9.3.8) has been performed in mobile station 10 or not. For example, on reception of a message for initiating "emergency call establishment" from mobile station 10, call controller 404B checks whether the EMERGENCY SETUP procedure has been performed or not from an information element "Emergency setup message type".

If any one of checks in steps S601 to S603 matches, in step S604 call controller 404B determines that the call type is the emergency call, and determines that the Call Type parameter is "Normal Call". On the other hand, if none of the checks matches, in step S605 call controller 404B determines that the call type is a normal call, and determines that the Call Type parameter is "Emergency Call".

Referring to FIG. 28 again, in MSC 40, in step S503 call controller 404B specifies the Call Type parameter if the call type parameter is determined when transmitting the RANAP: COMMON ID message to HNB-GW 30. FIG. 30 shows a configuration of the RANAP: COMMON ID message according to the present invention.

In HNB-GW 30, in step S504 if the Call Type parameter is included when RANAP: COMMON ID message is received, in step S505 call controller 306B comparers the parameter with the Registration Cause parameter (FIG. 6) of the HNBAP: UE REGISTER REQUEST message (FIG. 5) when mobile station 10 has accessed HNB-GW 30.

FIG. 31 is a diagram showing a table for determining a process in HNB-GW 30 according to the call type of this exemplary embodiment.

For example, in case 2 shown in FIG. 31, the Call Type parameter notified by MSC 40 is a "Normal Call" even though the Registration Cause parameter of the HNBAP: UE REGISTER REQUEST message is an "Emergency Call". Based thereon, HNB-GW 30 determines that mobile station 10 has falsified the call as an emergency call and accessed HNB 20 in an unauthorized manner, and performs the call releasing process.

This can prevent unauthorized mobile station 10-2 originally inaccessible to HNB 20 from falsifying the Establishment Cause, misrepresenting the call as an emergency call and enjoying the service by HNB 20.

(1-B) A Case of a Packet Switching Call

Next, an operation example of a case where SGSN 50 notifies the determination result of the call type of the packet switching call by means of the COMMON ID message of the RANAP is described.

An operation sequence of the case of the packet switching call is analogous to the above case except that the processes performed in MSC 40 in the case of the circuit switching call are performed in SGSN 50. However, a process of determining the Call Type parameter initiated in step S502 is different.

Figure 32:
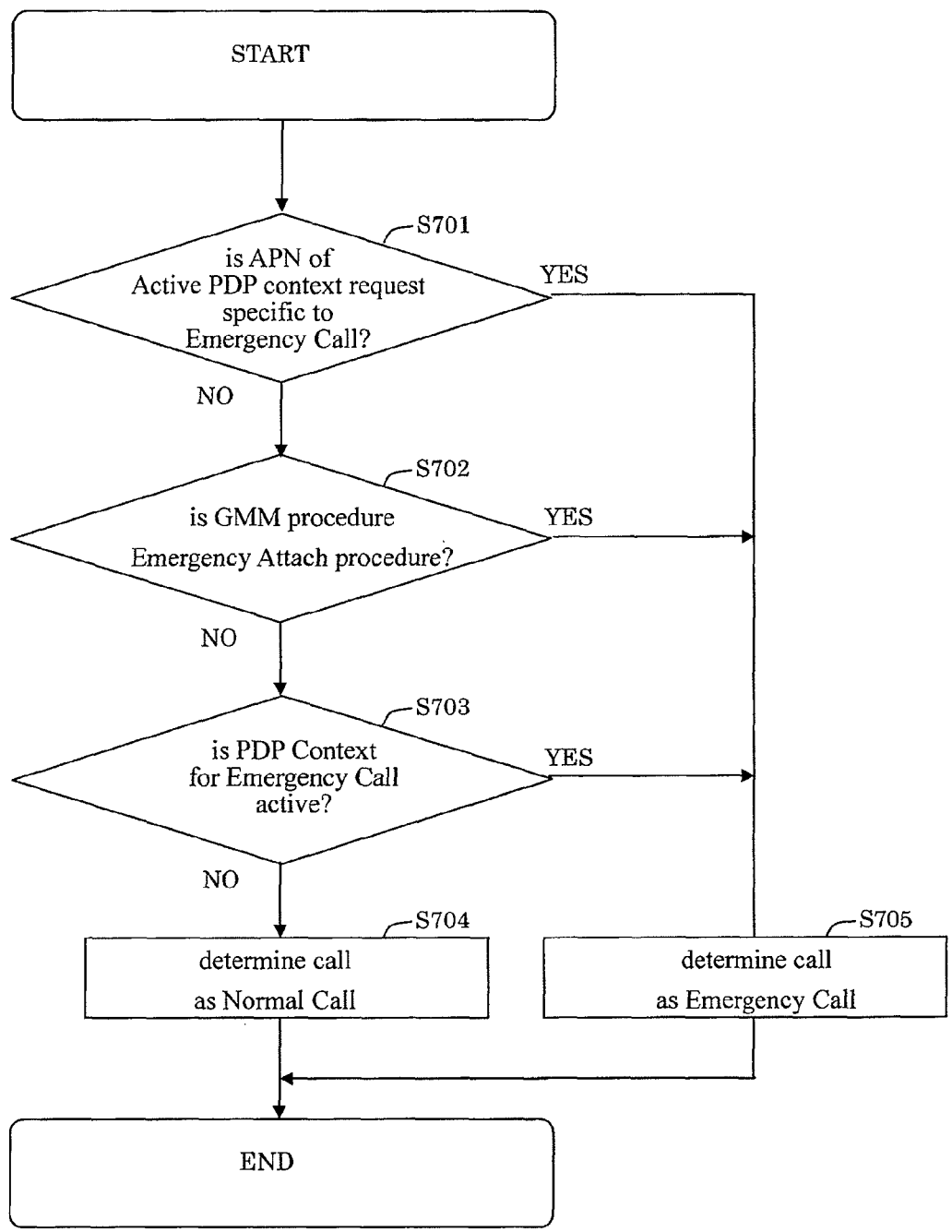
FIG. 32 is a flowchart of showing a process of determining a Call Type parameter by the SGSN of the fourth exemplary embodiment.

FIG. 32 shows a flowchart of the process of determining the Call Type parameter in SGSN 50.

Referring to FIG. 32, in step S701, call controller 504B checks whether an APN (3GPP TS24.008 9.5.1 10.5.6.1) set in an Activate PDP context request message (3GPP TS24.008 Ver 8.5.0 Section 9.5.1) set in the SM protocol transmitted from mobile station 10 is specific to an emergency call or not.

Next, in step S702, call controller 504B checks whether the GMM procedure performed in mobile station 10 is the Emergency Attach procedure (TR23.869 Ver 9.0.0) or not.

Next, in step S703, call controller 504B checks whether the PDP Context active in SGSN 50 is the PDP Context dedicated to an emergency call or not. For example, call controller 504B checks whether the PDP Context active in SGSN 50 is the Emergency PDP Context of TR23.869 Ver 9.0.0 or not.

If any one of the checks in steps S701 to S703 matches, in S704 call controller 504B determines that the call type is the emergency call, and determines that the Call Type parameter is a "Normal Call". On the other hand, if none of the checks matches, in step S705 call controller 504B determines that the call type is a normal call, and determines that the Call Type parameter as "Emergency Call".

When the RANAP: COMMON ID message is transmitted to HNB-GW 30, if the call type parameter has been determined, in SGSN 50 call controller 504B specifies this Call Type parameter. The configuration of the RANAP: COMMON ID message according to the present invention is the same as in the case of MSC 40 as shown in FIG. 30.

If the Call Type parameter is included when RANAP: COMMON ID message is received, in HNB-GW 30 call controller 306B compares the parameter with the Registration Cause parameter (FIG. 6) of the HNBAP: UE REGISTER REQUEST message (FIG. 5) when the mobile station 10 accesses HNB-GW 30.

For example, in the case 2 shown in FIG. 31, the Call Type parameter notified by SGSN 50 is a "Normal Call" even though the Registration Cause parameter of HNBAP: UE REGISTER REQUEST message is an "Emergency Call". Based thereon, HNB-GW 30 determines that mobile station 10 misrepresents the call as an emergency call and accesses HNB 20 in an unauthorized manner, and performs the call releasing process.

This can prevent unauthorized mobile station 10-2 originally inaccessible to HNB 20 from falsifying the Establishment Cause, misrepresenting the call as an emergency call and enjoying the service by HNB 20 even in the case of the packet switching VoIP.

(2) Operation Example 2

This operation example is an example where the determination result of the call type determined in MSC 40 or SGSN 50 is notified by means of the DIRECT TRANSFER message of the RANAP (3GPP TS25.413).

(2-A) A Case of a Circuit Switching Call

Figure 33:
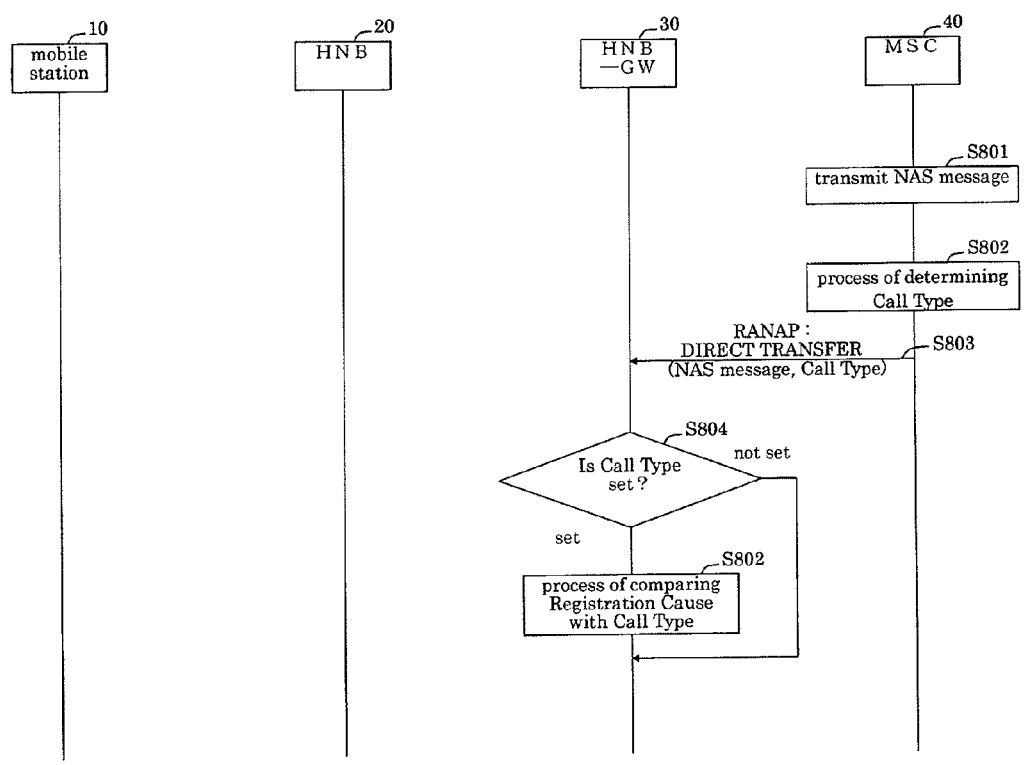
FIG. 33 is a sequence diagram illustrating an operation example 2 of the mobile communication system of the fourth exemplary embodiment.

First, an operation example of a case where MSC 40 notifies a determination result of the call type of a circuit switching call by means of a DIRECT TRANSFER message of the RANAP is described along with a sequence diagram of FIG. 33. FIG. 33 shows the operation after completion of the process shown in FIG. 15. However, the processes in steps S112, S113, S116 and S117 shown in FIG. 15 are not performed. Further, the Emergency Cause parameter is not included in the RANAP: INITIAL UE MESSAGE message transmitted in steps S114 and S115.

Typically, as described in 3GPP TS25.413, when the core network apparatus transmits NAS messages, such as the CC protocol and the MM protocol, the core network apparatus transmits the RANAP: DIRECT TRANSFER message to HNB-GW 30.

Accordingly, referring to FIG. 33, in MSC 40, in step S801 call controller 404B transmits the NAS message, and subsequently in step S802 initiates a process of determining the Call Type parameter. The process of determining the Call Type parameter in MSC 40 is the same as with operation example 1 and as described in FIG. 29.

In MSC 40, when call controller 404B transmits the RANAP: DIRECT TRANSFER message to HNB-GW 30, if the Call Type parameter is determined, in step S803 call controller 404B specifies this Call Type parameter. FIG. 34 shows the configuration of the RANAP: DIRECT TRANSFER message according to the present invention.

In HNB-GW 30, in a case where call controller 306B receives the RANAP: DIRECT TRANSFER message, if in step S804 the Call Type parameter is included, in step S805 call controller 306B compares the parameter with the Registration Cause parameter (FIG. 6) of the HNBAP: UE REGISTER REQUEST message (FIG. 5) when mobile station 10 has accessed HNB-GW 30.

For example, in the case 2 shown in FIG. 31, the Call Type parameter notified from MSC 40 is a "Normal Call" even though the Registration Cause parameter of HNBAP: UE REGISTER REQUEST message is an "Emergency Call". Based thereon, HNB-GW 30 determines that mobile station 10 misrepresents the call as an emergency call and accesses HNB 20 in an unauthorized manner, and performs the call releasing process.

This can prevent unauthorized mobile station 10-2 originally inaccessible to HNB 20 from falsifying the Establishment Cause, misrepresenting the call as an emergency call and enjoying the service by HNB 20.

(1-B) A Case of a Packet Switching Call

Next, an operation example of a case where SGSN 50 notifies the determination result of the call type of the packet switching call by means of the DIRECT TRANSFER message of the RANAP is described.

An operation sequence of the case of the packet switching call is analogous to the above case except that the processes performed in MSC 40 in the case of the circuit switching call are performed in SGSN 50. However, the process of determining the Call Type parameter initiated in step S802 is different. The process of determining the Call Type parameter in SGSN 50 is the same as with operation example 1 and as described in FIG. 32.

In SGSN 50, in a case where call controller 504B transmits the RANAP: DIRECT TRANSFER message to HNB-GW 30, if the Call Type parameter is determined, call controller 504B sets this Call Type parameter. The configuration of the RANAP: DIRECT TRANSFER message according to the present invention is the same as with the case of MSC 40 as shown in FIG. 34.

In HNB-GW 30, in a case where call controller 306B receives the RANAP: DIRECT TRANSFER message, if the Call Type parameter is included, call controller 306B compares the parameter with the Registration Cause parameter (FIG. 6) of the HNBAP: UE REGISTER REQUEST message (FIG. 5) when mobile station 10 has accessed HNB-GW 30.

For example, in the case 2 shown in FIG. 31, the Call Type parameter notified from SGSN 50 is a "Normal Call" even though the Registration Cause parameter of HNBAP: UE REGISTER REQUEST message is an "Emergency Call". Based thereon, HNB-GW 30 determines that mobile station 10 misrepresents the call as an emergency call and accesses HNB 20 in an unauthorized manner, and performs the call releasing process. This can prevent unauthorized mobile station 10-2 originally inaccessible to HNB 20 from falsifying the Establishment Cause, misrepresenting the call as an emergency call and enjoying the service by HNB 20 even in the case of the packet switching VoIP.

(3) Operation Example 3

This operation example is an example where the determination result of the call type determined in MSC 40 or SGSN 50 is notified by means of the RAB (Radio Access Bearer) ASSIGNMENT REQUEST message of the RANAP (3GPP TS25.413).

(3-A) A Case of a Circuit Switching Call

Figure 35:
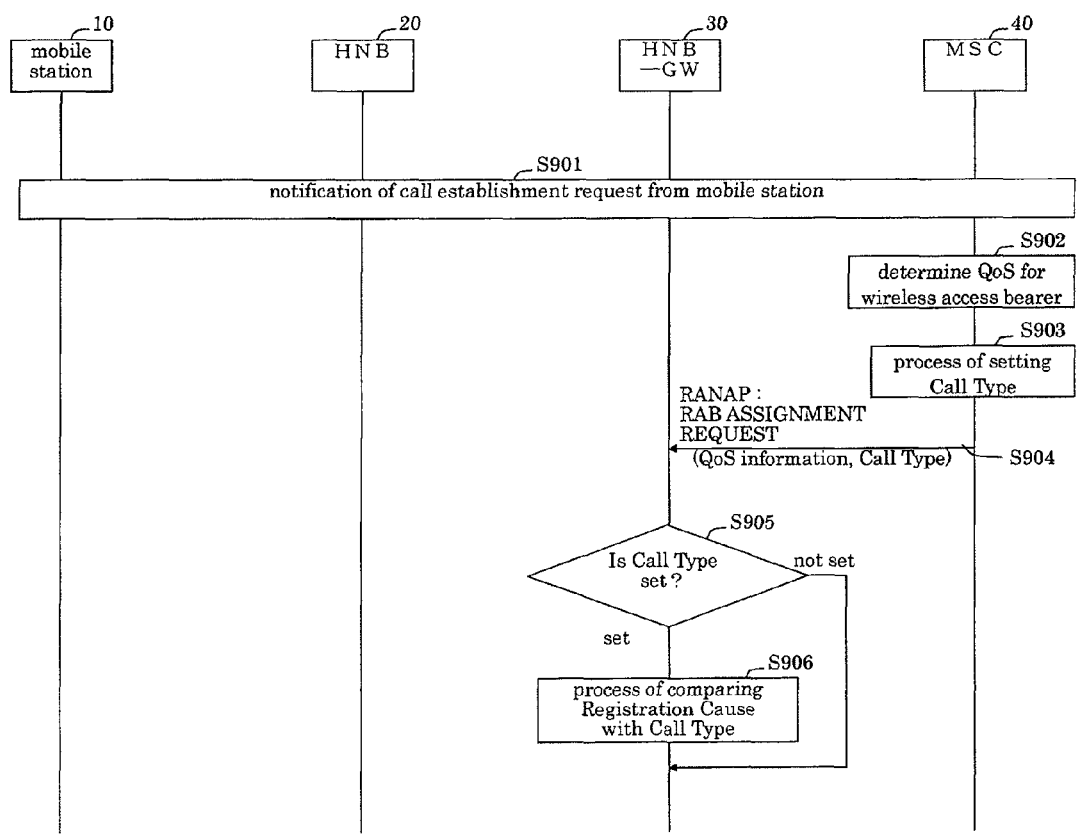
FIG. 35 is a sequence diagram illustrating an operation example 3 of the mobile communication system of the fourth exemplary embodiment.

First, an operation example of a case where MSC 40 notifies a determination result of the call type of a circuit switching call by means of an RAB ASSIGNMENT REQUEST message of the RANAP is described along with a sequence diagram of FIG. 35. FIG. 35 shows the operation after completion of the process shown in FIG. 15. However, the processes in steps S112, S113, S116 and S117 shown in FIG. 15 are not performed. Further, the Emergency Cause parameter is not included in the RANAP: INITIAL UE MESSAGE message transmitted in steps S114 and S115.

Typically, as described in 3GPP TS25.413, when the core network apparatus receives a call establishment request from mobile station 10 and establishes a wireless access bearer, the core network apparatus transmits the RANAP: RAB ASSIGNMENT REQUEST message to HNB-GW 30.

Accordingly, referring to FIG. 35, in MSC 40, in step S901 call controller 404B receives the call establishment request from mobile station 10, and subsequently in step S902 determines a QoS (Quality of Service) for a wireless access bearer, and then in step S903 initiates a process of determining the Call Type parameter. The process of determining the Call Type parameter in MSC 40 is the same as with operation example 1 and as described in FIG. 29.

In MSC 40, when in step S904 call controller 404B transmits the RANAP: RAB ASSIGNMENT REQUEST message to HNB-GW 30, if the Call Type parameter is determined, call controller 404B sets this Call Type parameter. FIG. 36 shows the configuration of the RANAP: RAB ASSIGNMENT REQUEST message according to the present invention.

In HNB-GW 30, in a case where call controller 306B receives the RANAP: RAB ASSIGNMENT REQUEST message, if in step S905 the Call Type parameter is included, in step S906 call controller 306B compares the parameter with the Registration Cause parameter (FIG. 6) of the HNBAP: UE REGISTER REQUEST message (FIG. 5) when mobile station 10 has accessed HNB-GW 30.

For example, in case 2 shown in FIG. 31, the Call Type parameter notified from MSC 40 is a "Normal Call" even though the Registration Cause parameter of HNBAP: UE REGISTER REQUEST message is an "Emergency Call". Based thereon, HNB-GW 30 determines that mobile station 10 misrepresents the call as an emergency call and accesses HNB 20 in an unauthorized manner, and performs the call releasing process.

This can prevent unauthorized mobile station 10-2 that is originally inaccessible to HNB 20 from falsifying the Establishment Cause, misrepresenting the call as an emergency call and enjoying the service by HNB 20.

(1-B) A Case of a Packet Switching Call

Next, an operation example of a case where SGSN 50 notifies the determination result of the call type of the packet switching call by means of the RAB ASSIGNMENT REQUEST message of the RANAP is described.

An operation sequence of the case of the packet switching call is analogous to the above case except that the processes performed in MSC 40 in the case of the circuit switching call are performed in SGSN 50. However, a process of determining the Call Type parameter initiated in step S802 is different. The process of determining the Call Type parameter in SGSN 50 is the same as with operation example 1 and as described in FIG. 32.

In SGSN 50, in a case where call controller 504B transmits the RANAP: RAB ASSIGNMENT REQUEST message to HNB-GW 30, if the Call Type parameter is determined, call controller 504B sets this Call Type parameter. The configuration of the RANAP: RAB ASSIGNMENT REQUEST message according to the present invention is the same as with the case of MSC 40 as described in FIG. 36.

In HNB-GW 30, in a case where call controller 306B receives the RANAP: RAB ASSIGNMENT REQUEST message, if the Call Type parameter is included, call controller 306B compares the parameter with the Registration Cause parameter (FIG. 6) of the HNBAP: UE REGISTER REQUEST message (FIG. 5) when mobile station 10 has accessed HNB-GW 30.

In case 2 shown in FIG. 31, the Call Type parameter notified from SGSN 50 is a "Normal Call" even though the Registration Cause parameter of HNBAP: UE REGISTER REQUEST message is an "Emergency Call". Based thereon, HNB-GW 30 determines that mobile station 10 misrepresents the call as an emergency call and accesses HNB 20 in an unauthorized manner, and performs the call releasing process.

This can prevent unauthorized mobile station 10-2 originally inaccessible to HNB 20 from falsifying the Establishment Cause, misrepresenting the call as an emergency call and enjoying the service by HNB 20 even in the case of the packet switching VoIP.

The methods performed in HNB 20, HNB-GW 30, MSC 40 and SGSN 50 of the present invention may be applied to programs to be performed by a computer. The program can be stored in a storing medium, and provided for the outside via a network.

(Fifth Exemplary Embodiment)

In second exemplary embodiment, the anti-fraud process is performed in MSC 40 or SGSN 50. However, in this exemplary embodiment the anti-fraud process is performed in HNB-GW 30.

Figure 37:
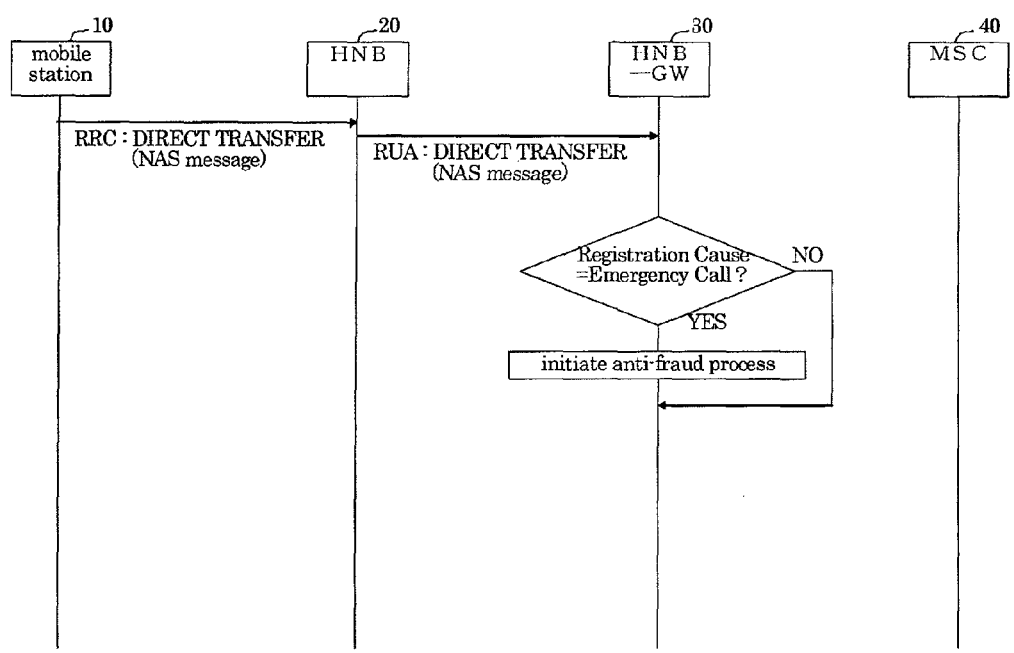
FIG. 37 is a sequence diagram illustrating an operation of a mobile communication system of a fifth exemplary embodiment.

FIG. 37 shows a sequence in this case. FIG. 37 shows a case where HNB-GW has preliminarily been notified of Registration Cause=Emergency Call in a UE Register procedure and HNB-GW checks the contents of the NAS message and initiates an anti-fraud process. This corresponds to a case where, when MSC has been notified from HNB-GW that UE has originated a call as an emergency call in FIG. 15, MSC performs a process of checking a message of the MM or the CC protocol in FIG. 20. Likewise, this corresponds to a case where, when HNB-GW indicates that UE has originated a call as an emergency call, SGSN performs a process of checking a message of the GMM or SM protocol in FIG. 21. The NAS message indicates Non Access Stratum, and indicates a protocol independent from a wireless access system.

This exemplary embodiment exerts the following advantageous effects.

The HNG-GW performs the anti-fraud process, thereby negating the need of accompanied modification on the MSC or the SGSN. Accordingly, the MSC or the SGSN having already been operated is not modified when the femto is introduced. This enables the femto system to be easily introduced.

Compared with the second exemplary embodiment, it is not necessary to add a new parameter to the RANAP protocol. This allows the size of the message of the RANAP protocol to be reduced, and enables the amount of signaling that is communicated between the HNB-GW and the MSC or the SGSN to be reduced.

The HNB-GW is capable of knowing whether a call is an emergency call or a normal call by taking a quick look at the NAS message. Accordingly, the HNB-GW is capable of raising the priority of the emergency call procedure higher than that of the normal call with respect to resource assignment and traffic scheduling, even without notification of the call type from the MSC or the SGSN.

(Sixth Exemplary Embodiment)

Figure 38:
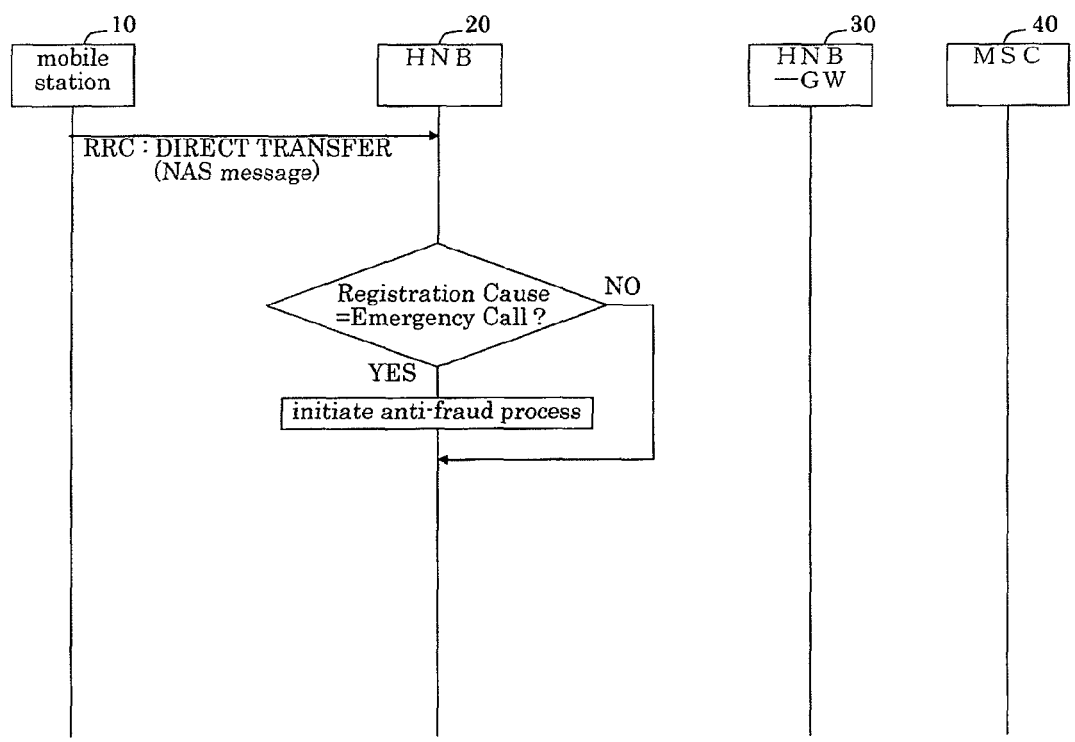
FIG. 38 is a sequence diagram illustrating an operation of a mobile communication system of a sixth exemplary embodiment.

In the fifth exemplary embodiment, in a case where a terminal has originated a call as an emergency call, HNB-GW takes a quick look at the NAS message, thereby realizing the anti-fraud process. In this exemplary embodiment, this anti-fraud process is performed in HNB. That is, as shown in FIG. 38, HNB takes a quick look at the NAS message and initiates the anti-fraud process.

This exemplary embodiment exerts following advantageous effects.

Since the FMB performs the anti-fraud process, communication with an unauthorized terminal can be terminated faster than that in a case where a higher-level device performs the anti-fraud process. This allows usability of network resources to be improved, and enables the amount of signaling between the HNB and the HNB-GW to be reduced.

The HNB is capable of recognizing whether a call is an emergency call or a normal call by taking a quick look at the NAS message. Accordingly, the HNB is capable of raising the priority of the emergency call procedure higher than that of the normal call with respect to resource assignment and traffic scheduling, without notification of the call type from the MSC or the SGSN.

(Seventh Exemplary Embodiment)

In the third exemplary embodiment, the MSC or SGSN notifies the HNB-GW of the information of the emergency call, the HNB-GW verifies whether the UE has tried access as an emergency call or not. In the fourth exemplary embodiment, the parameter of the Call Type is used in the RANAP protocol.

This exemplary embodiment employs a parameter that is already defined in the 3GPP TS25.413 as information representing the emergency call of the RANAP and that is referred to as Allocation/Retention Priority (see FIG. 39).

The method of using the Allocation/Retention Priority is well known as a publicly-known technique and thus is outside the scope of the present invention. For example, this technique is used for pre-emption in which, when resources for assigning a new bearer cannot be secured, another bearer that has less priority is released and the resources are vacated, thereby allowing the new bearer to acquire the resources.

In a case of an emergency call, the MSC or the SGSN sets this Allocation/Retention Priority parameter in the RAB ASSIGNMENT REQUEST message as follows.

Priority Level=1
Pre-emption Capability="may trigger pre-emption"
Pre-emption Vulnerability=not pre-emptable Notification can be made that the call is to be established as an emergency call according to such setting. Further, a message other than the RAB ASSIGNMENT REQUEST message of the RANAP may be used. In this case, logic of setting the Allocation/Retention Priority parameter as an emergency call in the MSC or the SGSN is analogous to that in FIGS. 29 and 32, and the same as with FIGS. 40 and 41.

Figure 40:
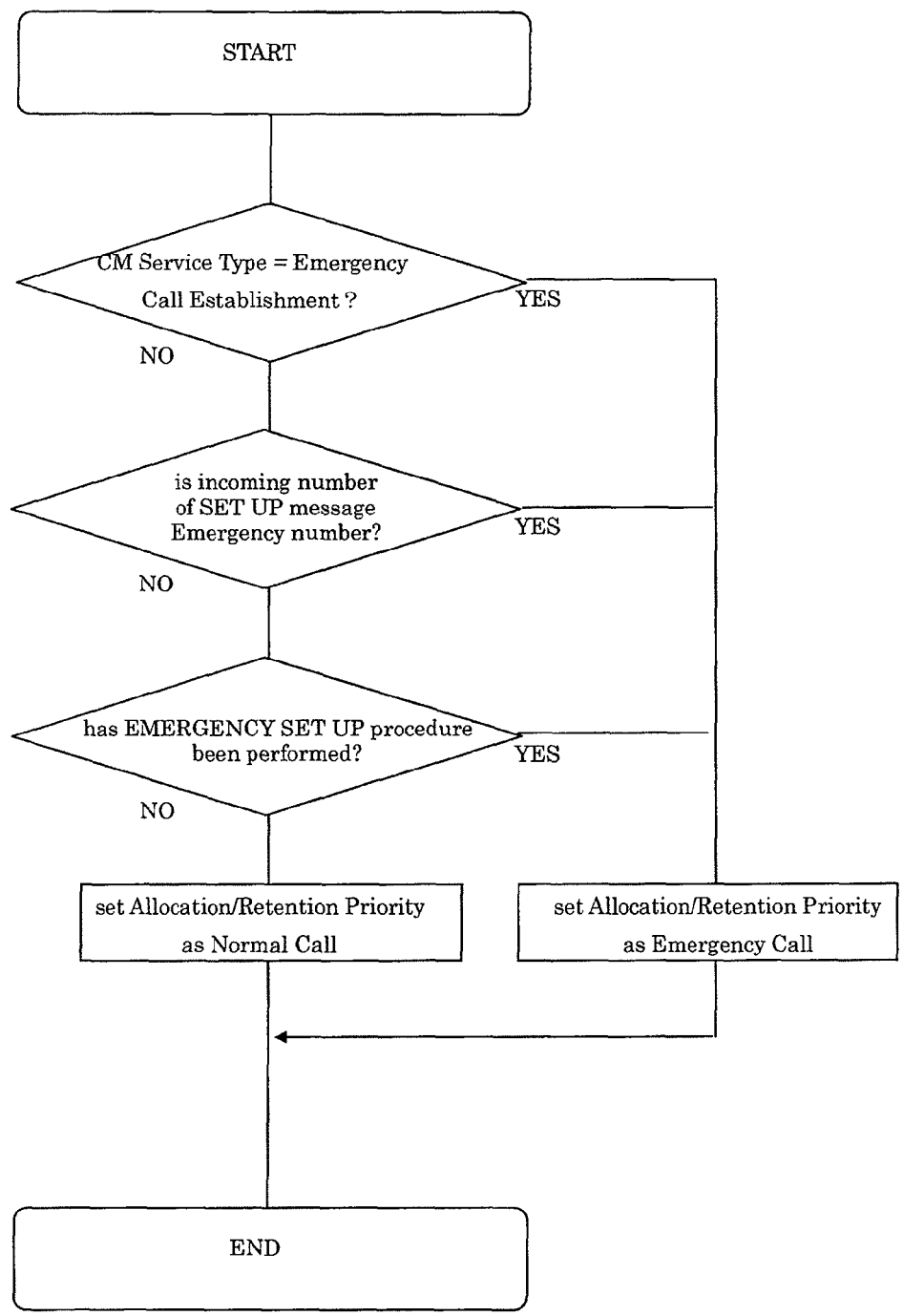
FIG. 40 is a flowchart showing a call type setting process by an MSC of the seventh exemplary embodiment.
Figure 41:
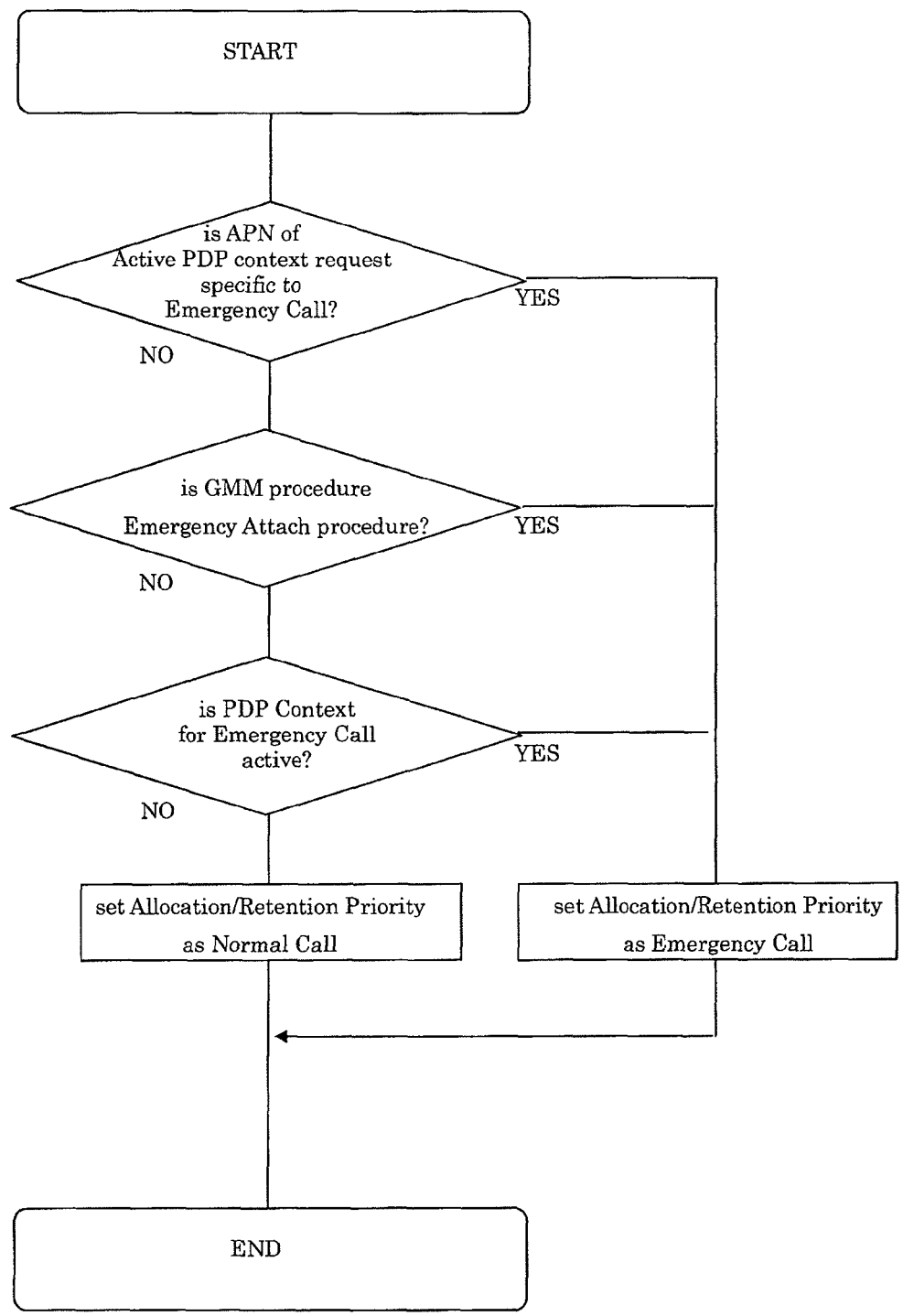
FIG. 41 is flowchart showing a call type setting process by SGSN of the seventh exemplary embodiment.
Figure 42:
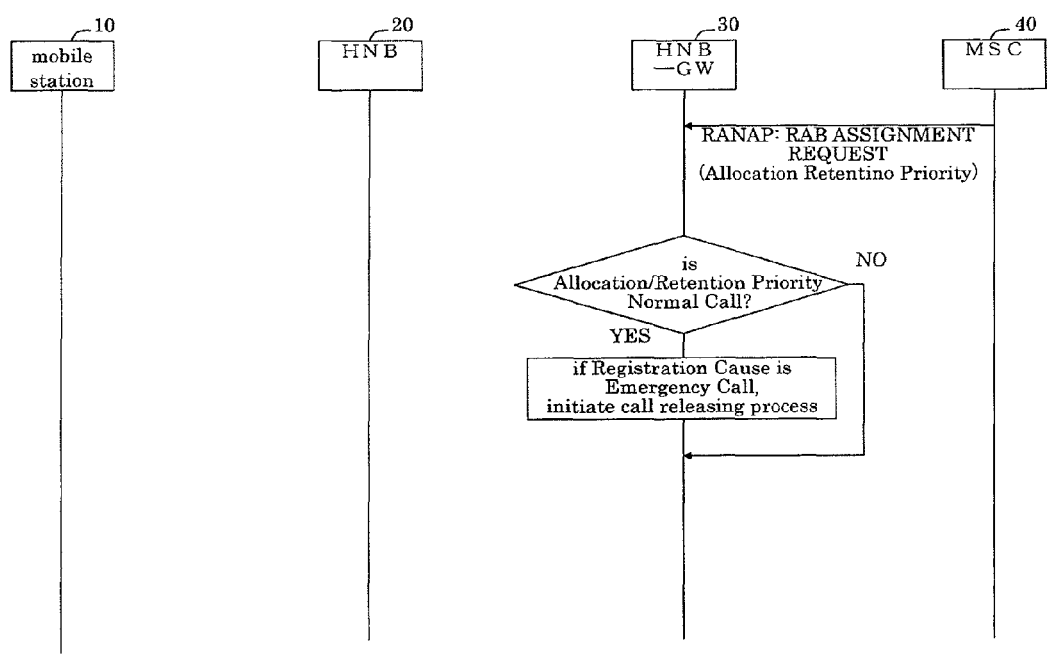
FIG. 42 is a sequence diagram illustrating an operation of a mobile communication system of the seventh exemplary embodiment.

In FIGS. 40 and 41, this Allocation/Retention Priority parameter indicates a normal call. However, in a case where the Registration Cause value in the UE Registration procedure indicates an emergency call, the HNB-GW determines that the UE has falsified the Establishment Cause and tried access, and performs call releasing. FIG. 42 shows an operation sequence in this case.

This exemplary embodiment exerts the following advantageous effects.

Notification is made whether the call is an emergency call or not using the existing Allocation/Retention Priority, thereby making unnecessary accompanied modification on the MSC or the SGSN. Accordingly, the MSC or the SGSN having already been operated is not modified when the femto is introduced. This enables the femto system to be easily introduced.

Compared with the fourth exemplary embodiment, it is not necessary to add a new parameter to the RANAP protocol. This allows the size of the message of the RANAP protocol to be reduced, and enables the amount of signaling that is communicated between the HNB-GW and the MSC or the SGSN to be reduced.

(Eighth Exemplary Embodiment)

Figure 43:
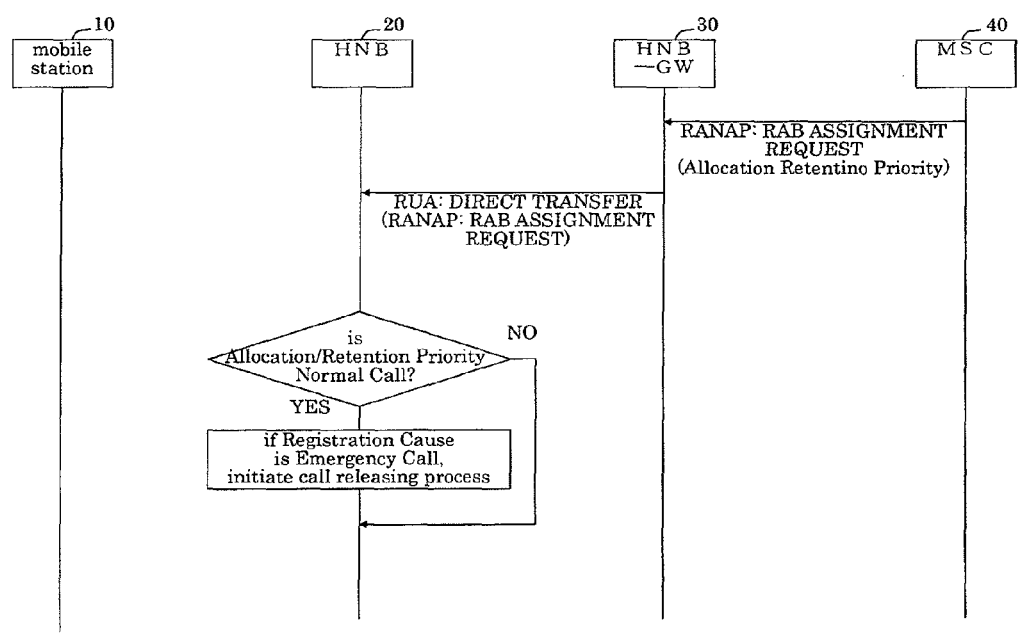
FIG. 43 is a sequence diagram illustrating an operation of a mobile communication system of an eighth exemplary embodiment.

In the seventh exemplary embodiment, the HNB-GW determines the Allocation/Retention Priority parameter, and realizes the anti-fraud process. However, in this exemplary embodiment, this anti-fraud process is performed in the HNB. That is, as shown in FIG. 43, when the HNB receives the RAB ASSIGNMENT REQUEST message of the RANAP, the HNB determines the Allocation/Retention Priority; in a case where the determination indicates the normal call, if the Registration Cause in the UE Registration procedure is an emergency call, the HNB-GW determines that the UE has misrepresented the Establishment Cause and tried access, and performs call releasing.

In the third and fourth exemplary embodiments, the HNB-GW performs the process of comparing the call type notified from the MSC or the SGSN and the Registration Cause when the UE has tried access with each other. However, this process of comparison may be performed in the FMB.

This exemplary embodiment exerts following advantageous effects.

The HNB-GW terminates the RANAP protocol message, and makes it unnecessary to determine the call type by means of the Allocation/Retention Priority. This enables the process in the HNB-GW to be simplified.

As described above, the present invention has been illustrated in a specified manner on the basis of the exemplary embodiments. The present invention is not limited to the above cases. Needless to say, various modifications may be made within a scope without departing the gist thereof.

For example, in the second exemplary embodiment, setting of the Emergency Cause value to the RANAP protocol message is made in HNB 20. However, this may be made in HNB-GW 30.

Further, in the first to fourth exemplary embodiments, the information representing that mobile station 10 has originated a call as an emergency call or the information representing that the actual type of the call that is originated by mobile station 10 is an emergency call, is communicated between HNB 20, HNB-GW 30 and the core network apparatus (MSC 40 or SGSN 50) using the RANAP protocol message. However, it is not limited to the RANAP protocol message. The message may be another message capable of communicating a message between HNB 20 and HNB-GW 30 or the core network apparatus.

The present application claims priority from Japanese patent application No. 2009-229391 filed on Oct. 1, 2009, the disclosure of which is herein incorporated by reference in its entirety.

The invention claimed is:

1. A mobile communication system, comprising:
a mobile station;
a base station wirelessly communicating with the mobile station; and
a gateway apparatus connected to the base station and a core network, wherein the base station comprises:
first transmission unit for transmitting a registration message for registering the mobile station in the gateway apparatus; and
second transmission unit for transmitting a direct transfer message including information pertaining to establishment of an emergency call,
the gateway apparatus comprises:
first reception unit for receiving the registration message from the base station;
second reception unit for receiving the direct transfer message from the base station; and
check unit for checking a consistency of information pertaining to the emergency call between the registration message and the direct transfer message,
wherein a procedure for the emergency call is performed based on a result of the checking the consistency of information.

2. The mobile communication system according to claim 1, wherein the check by the check unit is performed in a case where a Registration Cause included in the registration message indicates an Emergency Call.

3. A gateway apparatus connecting a base station to a core network, comprising:
first reception unit receiving a registration message for registering a mobile station in the gateway apparatus from the base station;
second reception unit receiving a direct transfer message including information pertaining to an emergency call from the base station; and
check unit for checking a consistency of information pertaining to the emergency call between the registration message and the direct transfer message,
wherein a procedure for the emergency call is performed based on a result of the checking the consistency of information.

4. The gateway apparatus according to claim 3, wherein the check by the check unit is performed in a case where a Registration Cause included in the registration message indicates an Emergency Call.

5. A communication method by a mobile communication system comprising:
a mobile station;
a base station wirelessly communicating with the mobile station; and
a gateway apparatus connected to the base station and a core network,
wherein the base station transmits a registration message for registering the mobile station in the gateway apparatus,
the base station transmits a direct transfer message including information pertaining to establishment of an emergency call,
the gateway apparatus receives the registration message from the base station,
the gateway apparatus receives the direct transfer message from the base station; and
the gateway apparatus performs a check of consistency of information pertaining to the emergency call between the registration message and the direct transfer message, and
wherein a procedure for the emergency call is performed based on a result of the performed check of the consistency of information.

6. The communication method according to claim 5, wherein the check is performed in a case where a Registration Cause included in the registration message indicates an Emergency Call.

7. A communication method by a gateway apparatus connecting a base station to a core network, including:
receiving a registration message for registering a mobile station in the gateway apparatus from the base station;
receiving a direct transfer message including information pertaining to establishment of an emergency call from the base station; and
performing a check of consistency of information pertaining to the emergency call between the registration message and the direct transfer message,
wherein a procedure for the emergency call is performed based on a result of the performed check of the consistency of information.

8. The communication method according to claim 7, wherein the check is performed in a case where a Registration Cause included in the registration message indicates an Emergency Call.

9. A mobile station in a mobile communication system comprising a gateway apparatus and a base station which is connected to the gateway apparatus, the mobile system comprising:

means for establishing a communication connection with the base station; and means for communicating with the base station, which transmits a registration message for registering the mobile station in the gateway apparatus and transmits a direct transfer message including information pertaining to establishment of an emergency call to the gateway apparatus, via the communication connection, wherein a consistency of information pertaining to the emergency call between the registration message and the direct transfer message is checked by the gateway apparatus, and wherein a procedure for the emergency call is performed based on a result of the checking the consistency of information.

10. The mobile communication system according to claim 1, wherein a procedure for the emergency call is performed based on a result of the checking the consistency of information.

11. The gateway apparatus according to claim 3, wherein a procedure for the emergency call is performed based on a result of the checking the consistency of information.

12. The communication method according to claim 5, wherein a procedure for the emergency call is performed based on a result of the performed check of consistency of information.

13. The communication method according to claim 7, wherein a procedure for the emergency call is performed based on a result of the performed check of consistency of information.

14. The mobile station according to claim 9, wherein a procedure for the emergency call is performed based on a result of the check of the consistency of information.

15. A gateway apparatus for facilitating communication between a base station and a network, comprising:

a first transceiver which receives, from the base station, a registration message for registering a mobile station in the gateway apparatus;

a second transceiver which receives, from the base station, a direct transfer message which includes information relating to an emergency call; and a controller which performs at least one check relating to the registration message and the direct transfer message, the at least one check including a check relating to a consistency of information between the registration message and the direct transfer message, and a procedure for the emergency call is performed based on a result of the performed check of the consistency of information.

16. The gateway apparatus according to claim 15, wherein the at least one check includes a check of whether the information relating to the emergency call includes service type information which relates to an emergency call establishment.

17. The gateway apparatus according to claim 15, wherein the at least one check includes a check of whether the information relating to the emergency call includes a telephone number which is an emergency telephone number.

18. The gateway apparatus according to claim 15, wherein the at least one check includes a check of whether the information relating to the emergency call includes information which indicates that the mobile station has performed an emergency setup procedure.

19. The gateway apparatus of claim 15, wherein the controller performs a call releasing process based on a result of the check by the check unit.

20. The gateway apparatus of claim 15, wherein the controller is configured to determine whether the emergency call is an emergency call that is originated by an authorized mobile station based on a result of the performed check.

* * * * *

UNITED STATES PATENT AND TRADEMARK OFFICE
CERTIFICATE OF CORRECTION

| | | |
|---|---|---|
| PATENT NO. | : 8,938,234 B2 | Page 1 of 1 |
| APPLICATION NO. | : 13/062053 | |
| DATED | : January 20, 2015 | |
| INVENTOR(S) | : Yoshio Ueda and Sadafuku Hayashi | |

It is certified that error appears in the above-identified patent and that said Letters Patent is hereby corrected as shown below:

Specification

Column 21, Line 61: delete "FMB" and insert -- HNB --

Column 23, Line 11: delete "FMB." and insert -- HNB. --

Signed and Sealed this
Third Day of November, 2015

Michelle K. Lee
*Director of the United States Patent and Trademark Office*